US008656625B2

(12) United States Patent
Holmberg

(10) Patent No.: US 8,656,625 B2
(45) Date of Patent: Feb. 25, 2014

(54) ACCESSORY MOUNT

(76) Inventor: Larry Holmberg, Gully, MN (US)

( * ) Notice: Subject to any disclaimer, the term of this patent is extended or adjusted under 35 U.S.C. 154(b) by 365 days.

(21) Appl. No.: 13/200,881

(22) Filed: Oct. 4, 2011

(65) Prior Publication Data

US 2012/0167437 A1   Jul. 5, 2012

Related U.S. Application Data

(63) Continuation-in-part of application No. 12/930,122, filed on Dec. 29, 2010.

(51) Int. Cl.
*F41A 15/00* (2006.01)

(52) U.S. Cl.
USPC ....... 42/90; 42/124; 42/106; 42/85; 124/44.5; 124/88

(58) Field of Classification Search
USPC ................. 42/90, 124, 106, 85; 124/44.5, 88
See application file for complete search history.

(56) References Cited

U.S. PATENT DOCUMENTS

| 521,761 | A | 6/1894 | Day |
|---|---|---|---|
| 547,912 | A | 10/1895 | Crupe |
| 619,214 | A | 2/1899 | Paul |
| 674,229 | A | 5/1901 | Windle |
| 845,165 | A | 2/1907 | Davis |
| 899,639 | A | 9/1908 | Vibber |
| 1,360,443 | A | 11/1920 | Robertson et al. |
| 1,452,651 | A | 4/1923 | Norrlin |
| 1,480,147 | A | 1/1924 | Brandt |
| 1,550,849 | A | 8/1925 | Szalardi |
| 1,735,164 | A | 11/1929 | Green |
| 1,757,244 | A | 5/1930 | Green |
| 1,923,926 | A | 8/1933 | Faure-Roux |
| 1,955,300 | A | 4/1934 | Kurnick |
| 2,072,387 | A | 3/1937 | Sneed |
| 2,101,479 | A | 12/1937 | Schenk |
| 2,129,606 | A | 9/1938 | Nisenson |
| 2,270,902 | A | 1/1942 | Rubissow |
| 2,282,680 | A | 5/1942 | Sonne |
| 2,296,308 | A | 9/1942 | Rand |
| 2,354,998 | A | 8/1944 | Ku |

(Continued)

FOREIGN PATENT DOCUMENTS

| CA | 2287748 A1 | 10/1999 |
|---|---|---|
| CA | 2534805 A1 | 1/2006 |

(Continued)

OTHER PUBLICATIONS

"Specification Sheet on the Impulse 200 LR Laser (Rangefinder)," Nov. 11, 2003, Publisher: Laser Technology Inc.

(Continued)

*Primary Examiner* — J. Woodow Eldred
(74) *Attorney, Agent, or Firm* — Kinney & Lange, P.A.

(57) ABSTRACT

A device for mounting more than one accessory to a weapon includes a clamp, a circular opening, and a weapon mount. The clamp receives a first accessory and the circular opening receives a second accessory. The clamp has a yoke and a strap securable around the first accessory. The circular opening is spaced laterally from the clamp such that the first accessory and the second accessory can be received in a parallel configuration. The weapon mount is located centrally between the clamp and the circular opening for attaching the device to the weapon.

20 Claims, 13 Drawing Sheets

(56) References Cited

U.S. PATENT DOCUMENTS

| | | |
|---|---|---|
| 2,416,769 A | 3/1947 | Palmer |
| 2,450,466 A | 10/1948 | Carlson |
| 2,456,554 A | 12/1948 | Churchill |
| 2,483,711 A | 10/1949 | Roos |
| 2,576,007 A | 11/1951 | Fischer et al. |
| 2,604,933 A | 7/1952 | Karg |
| 2,664,797 A | 1/1954 | Thrasher |
| 2,814,118 A | 11/1957 | Evans et al. |
| 2,817,233 A | 12/1957 | Dower et al. |
| 2,911,894 A | 11/1959 | Henning et al. |
| 2,943,547 A | 7/1960 | Martin |
| 3,035,880 A | 5/1962 | Hitchcock |
| 3,062,114 A | 11/1962 | Palos |
| 3,065,666 A | 11/1962 | Sampson |
| 3,078,728 A | 2/1963 | Schlesman |
| 3,165,972 A | 1/1965 | Cumbo |
| 3,371,899 A | 3/1968 | Johnson |
| 3,427,102 A | 2/1969 | Wade |
| 3,483,623 A | 12/1969 | Kruzell |
| 3,484,317 A | 12/1969 | Dickerson |
| 3,502,062 A | 3/1970 | Shurts |
| 3,545,356 A | 12/1970 | Nielsen |
| 3,684,376 A | 8/1972 | Lessard |
| 3,684,378 A | 8/1972 | Lord |
| 3,737,232 A | 6/1973 | Milburn, Jr. |
| 3,782,822 A | 1/1974 | Spence |
| 3,785,261 A | 1/1974 | Ganteaume |
| 3,834,052 A | 9/1974 | Steck, III |
| 3,945,134 A | 3/1976 | Ramer |
| 3,986,285 A | 10/1976 | Krisay |
| 4,000,403 A | 12/1976 | Rice |
| 4,026,054 A | 5/1977 | Snyder |
| 4,027,414 A | 6/1977 | Felix |
| 4,069,414 A | 1/1978 | Bell |
| 4,083,480 A | 4/1978 | Lee et al. |
| 4,162,696 A | 7/1979 | Sprung |
| 4,223,770 A | 9/1980 | Kranz |
| 4,234,112 A | 11/1980 | Gallant |
| 4,281,343 A | 7/1981 | Monteiro |
| 4,283,743 A | 8/1981 | Kaiser |
| T101,001 I4 | 9/1981 | Shipp et al. |
| D261,545 S | 10/1981 | Holmberg |
| 4,296,725 A | 10/1981 | Broderick |
| 4,309,095 A | 1/1982 | Buckley |
| 4,312,580 A | 1/1982 | Schwomma et al. |
| 4,316,342 A | 2/1982 | Griggs |
| 4,349,169 A | 9/1982 | McAnally |
| D268,910 S | 5/1983 | Shipp et al. |
| 4,439,032 A | 3/1984 | Congdon |
| 4,485,398 A | 11/1984 | Chapin, Jr. et al. |
| 4,485,407 A | 11/1984 | Böhm et al. |
| 4,507,689 A | 3/1985 | Kozuki et al. |
| 4,514,907 A | 5/1985 | Saltzman |
| 4,516,296 A | 5/1985 | Sherman |
| 4,531,052 A | 7/1985 | Moore |
| 4,561,204 A | 12/1985 | Binion |
| 4,564,322 A | 1/1986 | Stapley |
| 4,578,708 A | 3/1986 | Munnion |
| 4,597,211 A | 7/1986 | Miles |
| 4,604,668 A | 8/1986 | Lemelson |
| 4,606,629 A | 8/1986 | Hines et al. |
| 4,617,741 A | 10/1986 | Bordeaux et al. |
| 4,630,911 A | 12/1986 | Paul |
| 4,640,258 A | 2/1987 | Penney et al. |
| 4,643,159 A | 2/1987 | Ryan |
| 4,699,484 A | 10/1987 | Howell et al. |
| 4,730,190 A | 3/1988 | Win et al. |
| 4,733,838 A | 3/1988 | van der Lely |
| 4,753,528 A | 6/1988 | Hines et al. |
| 4,761,888 A | 8/1988 | Kudlacek |
| 4,777,352 A | 10/1988 | Moore |
| 4,786,204 A | 11/1988 | Mayeda |
| 4,786,966 A | 11/1988 | Hanson et al. |
| 4,819,101 A | 4/1989 | Lemelson |
| 4,827,348 A | 5/1989 | Ernest et al. |
| 4,835,621 A | 5/1989 | Black |
| 4,884,137 A | 11/1989 | Hanson et al. |
| 4,890,128 A | 12/1989 | Kania |
| 4,910,717 A | 3/1990 | Terry |
| 4,920,654 A | 5/1990 | Sanders |
| 4,939,863 A | 7/1990 | Alexander et al. |
| 4,961,111 A | 10/1990 | Herlitz et al. |
| 4,970,589 A | 11/1990 | Hanson et al. |
| 4,974,575 A | 12/1990 | Mitchell |
| D313,361 S | 1/1991 | Robinson |
| 4,989,024 A | 1/1991 | Myers |
| 4,993,833 A | 2/1991 | Lorey et al. |
| 4,996,866 A | 3/1991 | Masera et al. |
| 5,005,213 A | 4/1991 | Hanson et al. |
| 5,020,262 A | 6/1991 | Pena |
| 5,026,158 A | 6/1991 | Golubic |
| 5,033,219 A | 7/1991 | Johnson et al. |
| 5,035,390 A | 7/1991 | Sanders |
| 5,056,410 A | 10/1991 | Pitts |
| 5,068,720 A | 11/1991 | Herlitz et al. |
| 5,107,286 A | 4/1992 | Sergeant et al. |
| 5,113,745 A | 5/1992 | Allen |
| 5,115,263 A | 5/1992 | Bernhardt et al. |
| 5,119,203 A | 6/1992 | Hosaka et al. |
| 5,121,147 A | 6/1992 | Wada et al. |
| 5,161,310 A | 11/1992 | Stoot |
| 5,162,915 A | 11/1992 | Idera et al. |
| 5,192,227 A | 3/1993 | Bales |
| 5,200,827 A | 4/1993 | Hanson et al. |
| 5,244,430 A | 9/1993 | Legursky |
| 5,260,837 A | 11/1993 | Lemelson |
| 5,262,837 A | 11/1993 | Shyy |
| 5,265,896 A | 11/1993 | Kravitz |
| 5,285,894 A | 2/1994 | Kamata et al. |
| 5,287,133 A | 2/1994 | Bohley |
| 5,287,644 A | 2/1994 | Bolduc |
| 5,294,988 A | 3/1994 | Wakabayashi et al. |
| 5,297,533 A | 3/1994 | Cook |
| 5,305,030 A | 4/1994 | Yokoyama et al. |
| 5,326,061 A | 7/1994 | Hamilton |
| 5,339,793 A | 8/1994 | Findley |
| 5,373,657 A | 12/1994 | Betz et al. |
| 5,379,159 A | 1/1995 | Lemelson |
| 5,418,609 A | 5/1995 | Dunne |
| 5,419,072 A | 5/1995 | Moore et al. |
| 5,446,599 A | 8/1995 | Lemelson |
| 5,450,993 A | 9/1995 | Guerrero et al. |
| 5,455,625 A | 10/1995 | Englander |
| 5,456,157 A | 10/1995 | Lougheed et al. |
| 5,469,271 A | 11/1995 | Hoshino et al. |
| 5,479,712 A | 1/1996 | Hargrove et al. |
| 5,491,464 A | 2/1996 | Carter et al. |
| 5,491,546 A | 2/1996 | Wascher et al. |
| 5,491,919 A | 2/1996 | Rather et al. |
| 5,507,272 A | 4/1996 | Scantlen |
| 5,517,683 A | 5/1996 | Collett et al. |
| 5,520,164 A | 5/1996 | Huddleston |
| D371,084 S | 6/1996 | Ogawa |
| 5,528,325 A | 6/1996 | Perez |
| 5,531,149 A | 7/1996 | Schubert et al. |
| 5,537,175 A | 7/1996 | Kamaya et al. |
| 5,555,665 A | 9/1996 | Fore |
| 5,575,072 A | 11/1996 | Eldridge |
| D378,047 S | 2/1997 | Chudoba |
| 5,606,818 A | 3/1997 | Hardee |
| 5,607,091 A | 3/1997 | Musacchia |
| 5,610,580 A | 3/1997 | Lai |
| 5,610,655 A | 3/1997 | Wakabayashi et al. |
| 5,611,324 A | 3/1997 | Kursinsky |
| 5,615,854 A | 4/1997 | Nomura et al. |
| 5,669,147 A | 9/1997 | Nakajima et al. |
| 5,669,173 A | 9/1997 | Rodney, Jr. |
| 5,669,174 A | 9/1997 | Teetzel |
| 5,686,690 A | 11/1997 | Lougheed et al. |
| 5,687,910 A | 11/1997 | King |
| 5,694,169 A | 12/1997 | Noji |
| 5,694,202 A | 12/1997 | Mladjan et al. |
| 5,711,104 A | 1/1998 | Schmitz |
| D390,483 S | 2/1998 | Zykan et al. |

(56) References Cited

U.S. PATENT DOCUMENTS

| | | |
|---|---|---|
| 5,732,912 A | 3/1998 | Nomura et al. |
| 5,739,859 A | 4/1998 | Hattori et al. |
| 5,742,859 A | 4/1998 | Acker |
| 5,801,919 A | 9/1998 | Griencewic |
| 5,811,720 A | 9/1998 | Quinnell et al. |
| 5,815,251 A | 9/1998 | Ehbets et al. |
| 5,822,621 A | 10/1998 | Szajewski |
| 5,831,718 A | 11/1998 | Desai et al. |
| 5,834,676 A | 11/1998 | Elliott |
| 5,835,807 A | 11/1998 | Brock |
| 5,845,165 A | 12/1998 | McMahan |
| 5,859,693 A | 1/1999 | Dunne et al. |
| 5,867,930 A | 2/1999 | Kaminski |
| 5,887,375 A | 3/1999 | Watson |
| 5,892,617 A | 4/1999 | Wallace |
| 5,895,131 A | 4/1999 | Yano |
| 5,911,215 A | 6/1999 | Fisher, Jr. |
| 5,926,260 A | 7/1999 | Dunne et al. |
| 5,927,041 A | 7/1999 | Sedlmeier et al. |
| 5,937,562 A | 8/1999 | Brough |
| 5,941,434 A | 8/1999 | Green |
| 5,944,041 A | 8/1999 | Kitchens |
| 5,949,529 A | 9/1999 | Dunne et al. |
| 5,963,748 A | 10/1999 | Glasson |
| 5,964,054 A | 10/1999 | Galfidi, Jr. |
| 5,973,315 A | 10/1999 | Saldana et al. |
| 6,000,163 A | 12/1999 | Gordon |
| D421,229 S | 2/2000 | Imai |
| 6,029,643 A | 2/2000 | Golfieri |
| 6,070,355 A | 6/2000 | Day |
| 6,073,352 A | 6/2000 | Zykan et al. |
| D432,930 S | 10/2000 | Sanoner |
| 6,134,793 A | 10/2000 | Sauers |
| 6,137,564 A | 10/2000 | Schmidt et al. |
| 6,145,230 A | 11/2000 | Holmberg |
| 6,154,971 A | 12/2000 | Perkins |
| 6,155,601 A | 12/2000 | Cantor et al. |
| 6,192,614 B1 | 2/2001 | Cliburn |
| 6,252,706 B1 | 6/2001 | Kaladgew |
| 6,269,581 B1 | 8/2001 | Groh |
| 6,286,796 B1 | 9/2001 | Pugliesi |
| 6,288,386 B1 | 9/2001 | Bowen et al. |
| 6,304,289 B1 | 10/2001 | Sakai et al. |
| 6,331,887 B1 | 12/2001 | Shiraishi et al. |
| 6,336,285 B1 | 1/2002 | Baumer |
| 6,341,201 B1 | 1/2002 | Ishiguro et al. |
| 6,363,648 B1 | 4/2002 | Kranich et al. |
| 6,396,571 B2 | 5/2002 | Ohtomo et al. |
| 6,397,483 B1 | 6/2002 | Perkins |
| 6,398,571 B1 | 6/2002 | Nishide et al. |
| 6,408,140 B1 | 6/2002 | Malloy Desormeaux |
| D460,367 S | 7/2002 | Apotheloz et al. |
| D460,368 S | 7/2002 | Apotheloz et al. |
| D460,369 S | 7/2002 | Apotheloz et al. |
| 6,425,697 B1 | 7/2002 | Potts et al. |
| 6,450,816 B1 | 9/2002 | Gerber |
| 6,487,809 B1 | 12/2002 | Gaber |
| 6,494,196 B2 | 12/2002 | Harwath et al. |
| 6,494,368 B2 | 12/2002 | Sapia |
| 6,526,956 B1 | 3/2003 | Hankins |
| D472,826 S | 4/2003 | Sanoner |
| 6,556,245 B1 | 4/2003 | Holmberg |
| 6,598,331 B1 | 7/2003 | Thibodeaux |
| 6,615,531 B1 | 9/2003 | Holmberg |
| 6,623,182 B2 | 9/2003 | Tatera |
| 6,624,881 B2 | 9/2003 | Waibel et al. |
| 6,678,988 B1 | 1/2004 | Poff, Jr. |
| 6,681,755 B2 | 1/2004 | Pujos |
| 6,693,702 B2 | 2/2004 | Rogers |
| 6,704,097 B2 | 3/2004 | Waibel et al. |
| D488,315 S | 4/2004 | Natuzzi |
| 6,722,076 B2 | 4/2004 | Nielsen |
| 6,742,299 B2 | 6/2004 | Strand |
| 6,772,076 B2 | 8/2004 | Yamamoto et al. |
| 6,784,920 B2 | 8/2004 | Weber |
| 6,796,038 B2 | 9/2004 | Humphries |
| 6,813,025 B2 | 11/2004 | Edwards |
| 6,815,251 B1 | 11/2004 | Akram et al. |
| 6,819,495 B2 | 11/2004 | Shani et al. |
| 6,819,866 B2 | 11/2004 | Da Silva |
| 6,886,287 B1 | 5/2005 | Bell et al. |
| 6,886,288 B1 | 5/2005 | Yocum et al. |
| 6,932,305 B2 | 8/2005 | Moreales et al. |
| 6,988,331 B2 | 1/2006 | Holmberg |
| 7,002,620 B1 | 2/2006 | Rutledge |
| 7,006,144 B2 | 2/2006 | Holmberg |
| 7,088,506 B2 | 8/2006 | Regan et al. |
| 7,100,321 B2 | 9/2006 | Holmberg |
| 7,128,354 B2 | 10/2006 | Wu |
| 7,173,804 B2 | 2/2007 | Radhakrishnan et al. |
| 7,188,978 B2 | 3/2007 | Sharrah et al. |
| 7,206,024 B2 | 4/2007 | Tsukahara et al. |
| 7,255,035 B2 | 8/2007 | Mowers |
| 7,269,920 B2 | 9/2007 | Staley, III |
| 7,280,192 B2 | 10/2007 | Hayashi et al. |
| 7,327,394 B2 | 2/2008 | Holmberg |
| 7,371,021 B2 | 5/2008 | Ross, Jr. et al. |
| 7,390,130 B2 | 6/2008 | Soulvie |
| 7,394,528 B2 | 7/2008 | Hinchliff et al. |
| 7,505,248 B2 | 3/2009 | Mehr et al. |
| 7,584,569 B2 * | 9/2009 | Kallio et al. ............... 42/117 |
| 7,594,352 B2 | 9/2009 | Holmberg |
| 7,614,805 B2 | 11/2009 | Showalter |
| 7,661,221 B2 * | 2/2010 | Holmberg ................. 42/106 |
| 7,789,574 B2 | 9/2010 | Broberg |
| 2001/0018311 A1 | 8/2001 | Musacchia |
| 2001/0035440 A1 | 11/2001 | Danielson |
| 2002/0067475 A1 | 6/2002 | Waibel et al. |
| 2002/0071050 A1 | 6/2002 | Holmberg |
| 2002/0078577 A1 | 6/2002 | Aldred |
| 2002/0087475 A1 | 7/2002 | Okayama et al. |
| 2002/0109057 A1 | 8/2002 | Wooten et al. |
| 2002/0163588 A1 | 11/2002 | Holmberg |
| 2002/0167606 A1 | 11/2002 | Holmberg |
| 2002/0171755 A1 | 11/2002 | Nishimura |
| 2003/0013392 A1 | 1/2003 | Guillermin |
| 2003/0133092 A1 | 7/2003 | Rogers |
| 2003/0163943 A1 | 9/2003 | Holmberg |
| 2003/0168484 A1 | 9/2003 | Gates et al. |
| 2004/0000083 A1 | 1/2004 | Grant, Jr. |
| 2004/0016169 A1 | 1/2004 | Poff, Jr. |
| 2004/0051865 A1 | 3/2004 | Stierle et al. |
| 2004/0079018 A1 | 4/2004 | Holmberg |
| 2004/0114129 A1 | 6/2004 | Gogolla et al. |
| 2004/0135991 A1 | 7/2004 | Gogolla et al. |
| 2004/0183942 A1 | 9/2004 | Holmberg |
| 2004/0194364 A1 | 10/2004 | Holmberg |
| 2004/0257437 A1 | 12/2004 | Lesseu |
| 2005/0035245 A1 | 2/2005 | Morales et al. |
| 2005/0115141 A1 | 6/2005 | Holmberg |
| 2005/0123883 A1 | 6/2005 | Kennen et al. |
| 2005/0195358 A1 | 9/2005 | Holmberg |
| 2005/0195385 A1 | 9/2005 | Holmberg |
| 2005/0241210 A1 | 11/2005 | Karcher et al. |
| 2005/0246910 A1 | 11/2005 | Mowers |
| 2005/0252062 A1 | 11/2005 | Scrogin et al. |
| 2005/0268519 A1 | 12/2005 | Pikielny |
| 2005/0268521 A1 | 12/2005 | Cox et al. |
| 2006/0010761 A1 | 1/2006 | Staley, III |
| 2006/0067030 A1 | 3/2006 | Radhakrishnan et al. |
| 2006/0215149 A1 | 9/2006 | LaBelle et al. |
| 2006/0254116 A1 | 11/2006 | Holmberg |
| 2007/0002520 A1 | 1/2007 | Mehr et al. |
| 2007/0008187 A1 | 1/2007 | Schmidt |
| 2007/0031142 A1 | 2/2007 | Moody et al. |
| 2007/0068018 A1 | 3/2007 | Gilmore |
| 2007/0081817 A1 | 4/2007 | Soulvie |
| 2007/0125930 A1 | 6/2007 | Tsai |
| 2007/0130848 A1 | 6/2007 | Tsai |
| 2007/0157502 A1 | 7/2007 | Holmberg |
| 2007/0157503 A1 | 7/2007 | Holmberg |
| 2007/0186459 A1 | 8/2007 | Holmberg |
| 2007/0277421 A1 | 12/2007 | Perkins et al. |
| 2008/0000463 A1 | 1/2008 | Holmberg |

(56) References Cited

U.S. PATENT DOCUMENTS

| | | |
|---|---|---|
| 2008/0000465 A1 | 1/2008 | Holmberg |
| 2008/0001057 A1 | 1/2008 | Holmberg |
| 2008/0060248 A1 | 3/2008 | Pine et al. |
| 2008/0087784 A1 | 4/2008 | Holmberg |
| 2008/0092421 A1 | 4/2008 | Beckmann |
| 2008/0164392 A1 | 7/2008 | Holmberg |
| 2011/0099877 A1* | 5/2011 | Sandler ............................ 42/90 |
| 2012/0125307 A1* | 5/2012 | Bromley et al. ................. 124/88 |
| 2013/0081604 A1* | 4/2013 | Lee ................................ 124/88 |

FOREIGN PATENT DOCUMENTS

| | | |
|---|---|---|
| DE | 29608688 U1 | 8/1996 |
| EP | 1804017 A1 | 7/2007 |
| FR | 2369586 A1 | 5/1978 |
| GB | 2024558 A | 1/1980 |
| GB | 2114770 A | 8/1983 |
| JP | 099117 A | 1/1997 |
| JP | 09203944 A | 8/1997 |
| JP | 10145653 A | 5/1998 |
| WO | 9012330 | 10/1990 |
| WO | 9417444 | 8/1994 |
| WO | 2006090356 A1 | 8/2006 |
| WO | 2006133029 A1 | 12/2006 |

OTHER PUBLICATIONS

Improved Construction Methods, "Laser Measuring System, Impulse LX", http://www.improvedconstructionmethods.com/impulse_xl.htm.

Anderson et al., "Thermal Weapon Sight (TWS) AN-PAS-13 Diffractive Optics Designed for Producibility," Conf. on Binary Optics 1993.

Gilstrap et al., "Integrated Sight Boresighting," Mar. 1998.

\* cited by examiner

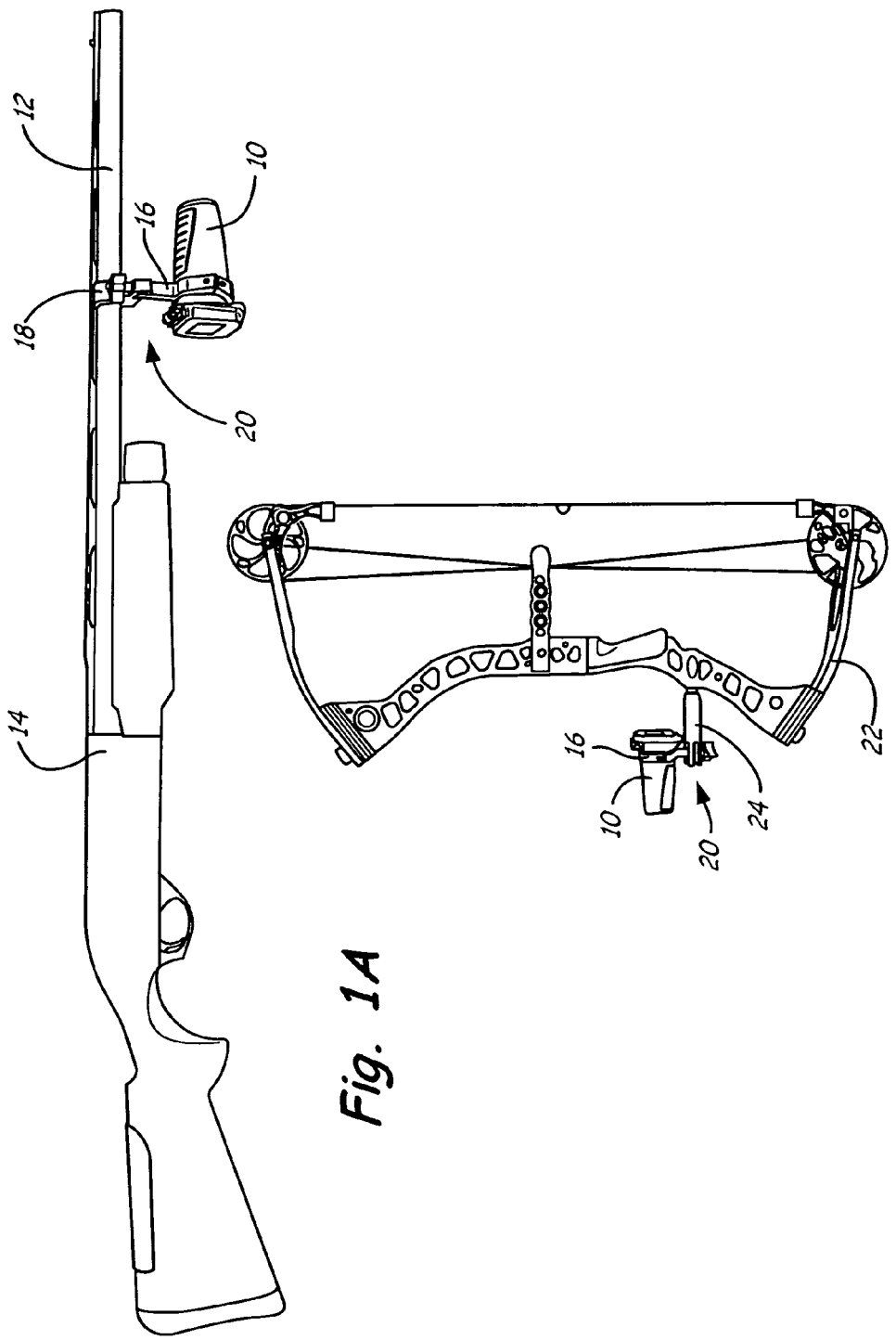

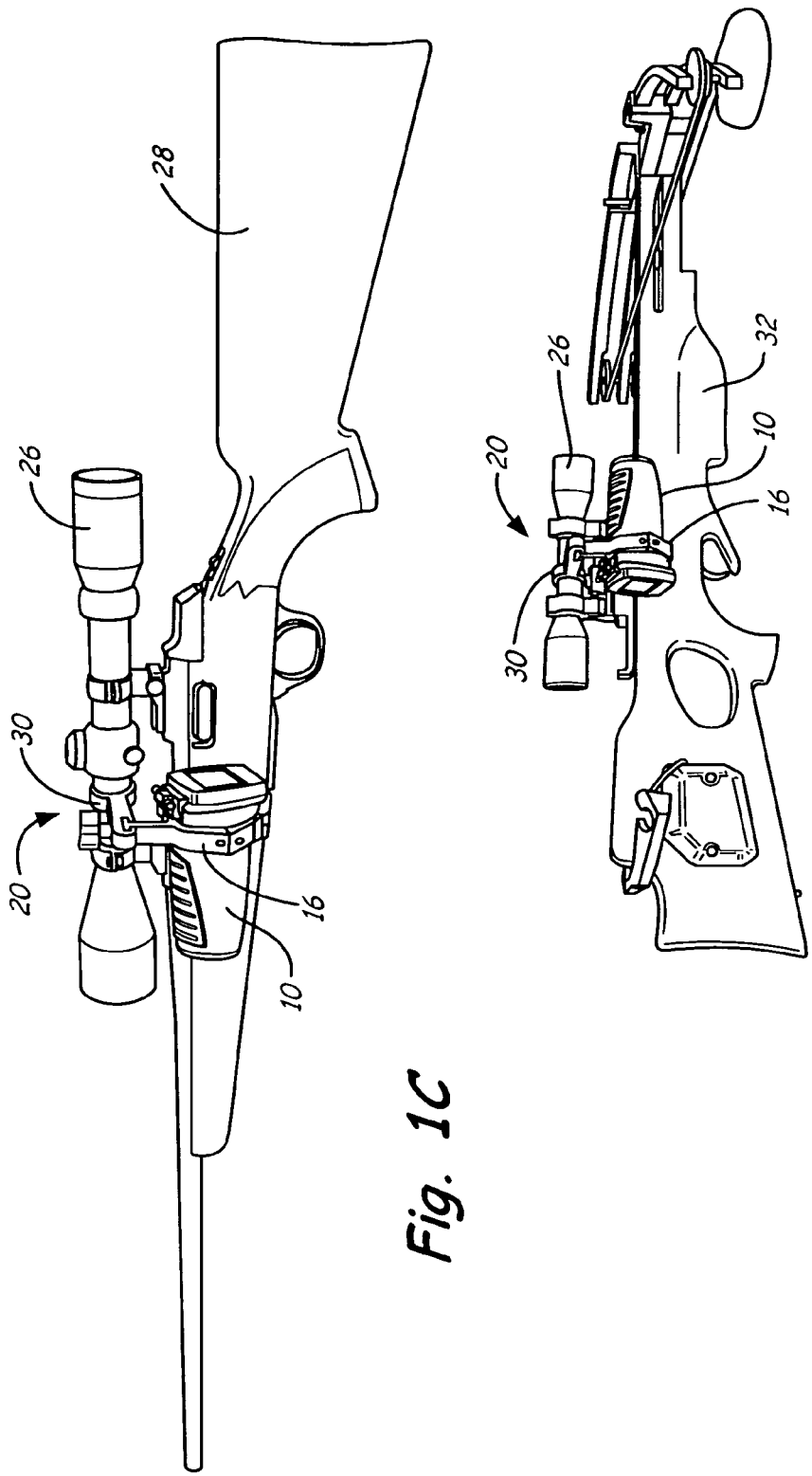

ACCESSORY MOUNT

CROSS-REFERENCE TO RELATED APPLICATION(S)

This application is a continuation-in-part of U.S. patent application Ser. No. 12/930,122 filed Dec. 29, 2010 and titled "Universal Device Mount".

BACKGROUND

The present disclosure relates generally to hunting weapons and more particularly to a system for mounting accessories onto hunting weapons.

Game hunters desire to attach accessories to their hunting weapons in a manner that does not impede their ability to hunt. Several mounting systems exist for attaching a specific accessory to a specific weapon. Any given hunter, however, may have a plurality of accessories such as rangefinders, cameras, and scopes. The same hunter may also have a plurality of weapons such as rifles, shotguns, bows, and crossbows. Each accessory and weapon combination necessitates a specific mounting system designed for attaching that accessory that weapon. Thus, the hunter is forced to either carry all possible combinations of accessories and weapons or leave some accessories and weapons at home.

SUMMARY

A device for mounting more than one accessory to a weapon includes a clamp, a circular opening, and a weapon mount. The clamp receives a first accessory and the circular opening receives a second accessory. The clamp has a yoke and a strap securable around the first accessory. The circular opening is spaced laterally from the clamp such that the first accessory and the second accessory can be received in a parallel configuration. The weapon mount is located centrally between the clamp and the circular opening for attaching the device to the weapon.

A device for mounting more than one accessory to a weapon includes a first clamp for receiving a first accessory, a second clamp for receiving a second accessory, and a weapon mount for attaching the device to the weapon. The first clamp has a yoke and a strap securable around the first accessory. The second clamp has a second yoke and a second strap securable around the second accessory. The second clamp is spaced laterally from the first clamp such that the first accessory and the second accessory are received in a parallel configuration. The weapon mount is located centrally between the first clamp and the second clamp.

A device for mounting more than one accessory to a weapon includes a clamp, a track, an arm, a circular opening, and a bow mount. The clamp is configured for receiving a first accessory. The clamp has a yoke, a strap, and a head protruding from the strap. The track is configured for receiving the head. The arm extends laterally from a first end to a second end. The track is located at the first end. The circular opening is configured for receiving a second accessory. The circular opening is located at the second end. The bow mount is configured for attaching the device to a bow. The bow mount is attached centrally to the arm between the first end and the second end.

BRIEF DESCRIPTION OF THE DRAWINGS

FIG. 1A is a perspective view of a camera mounted to a gun barrel by a mounting system in accordance with the present disclosure.

FIG. 1B is a side view of the camera mounted to a bow by the mounting system.

FIG. 1C is a perspective view of the camera mounted to a scope on a gun by the mounting system.

FIG. 1D is a perspective view of the camera mounted to a scope on a crossbow by the mounting system.

DETAILED DESCRIPTION

Figure 2:
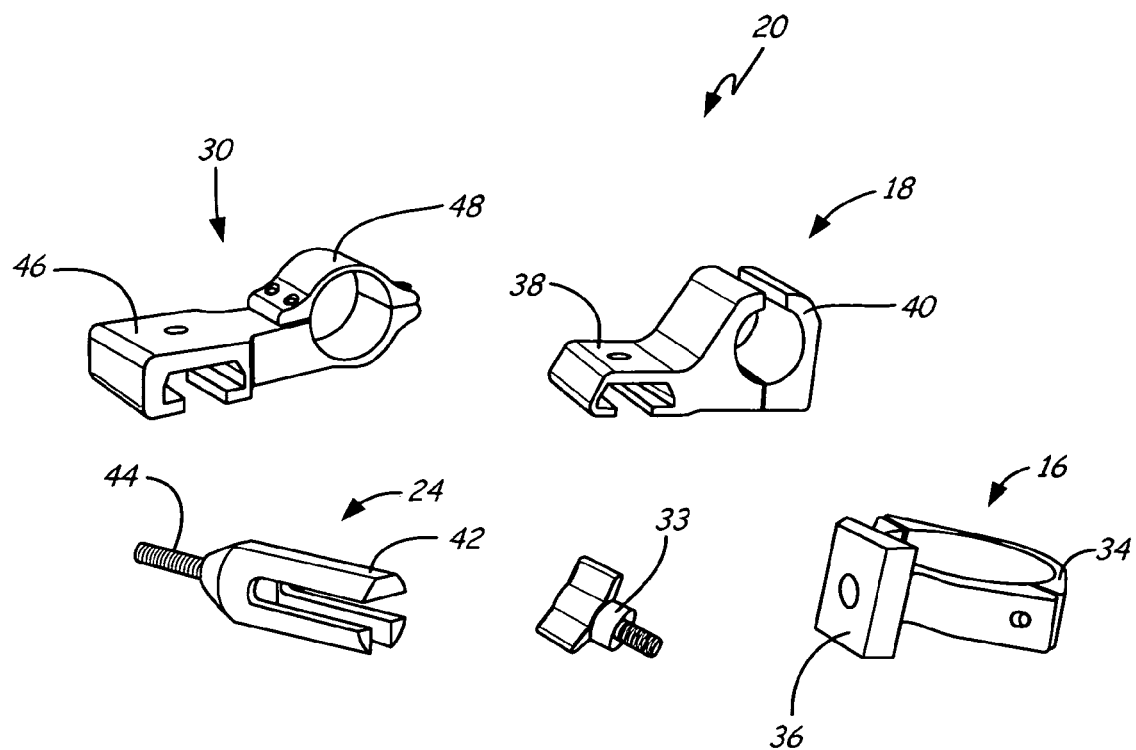
FIG. 2 is a perspective view of the mounting system components.

FIG. 1A is a perspective view of camera 10 mounted to barrel 12 of shotgun 14 by universal mounting member 16 and gun barrel mount 18 of mounting system 20. FIG. 1B is a side view of camera 10 mounted to bow 22 by universal mounting member 16 and bow mount 24 of mounting system 20. FIG. 1C is a perspective view of camera 10 mounted to scope 26 on rifle 28 by universal mounting member 16 and scope mount 30 of mounting system 20. FIG. 1D is a perspective view of camera 10 mounted to scope 26 on crossbow 32 by universal mounting member 16 and scope mount 30 of mounting system 20.

The combination of universal mounting member 16 and one of gun barrel mount 18, bow mount 24, and scope mount 30 provides a system for mounting camera 10 onto a plurality of weapons such as shotgun 14, bow 22, rifle 28, and crossbow 32. Universal mounting member 16 attaches camera 10, or any other hunting accessory (e.g. rangefinder, game caller, flashlight, laser pointer), to each of gun barrel mount 18, bow mount 24, and scope mount 30. The "universality" of universal mounting member 16 stems from its ability to remain attached to camera 10 and couple with each of gun barrel mount 18, bow mount 24, and scope mount 30. Accordingly, mounting system 20 can reduce the amount of equipment carried by a game hunter to attach an accessory to a plurality of hunting weapons.

In each of FIGS. 1A-1C, universal mounting member 16 is attached to camera 10 and coupled with another component of mounting system 20 in order to mount camera 10 onto a hunting weapon. In FIG. 1A, universal mounting member 16 is coupled to gun barrel mount 18. Since gun barrel mount 18 is secured to barrel 12 of shotgun 14, the coupling of universal mounting member 16 and gun barrel mount 18 mounts camera 10 onto shotgun 14. Universal mounting member 16 and gun barrel mount 18 are designed such that camera 10 is positioned downwardly and laterally from the attachment to barrel 12 and does not interfere with use of shotgun 14.

In FIG. 1B, universal mounting member 16 is coupled to bow mount 24. Since bow mount 24 is secured to bow 22, the coupling of universal mounting member 16 and gun bow mount 24 mounts camera 10 onto bow 22. Mounting member 16 and bow mount 24 are designed such that camera 10 is positioned outwardly in front of bow and does not interfere with use of bow 22.

In FIG. 1C, universal mounting member 16 is coupled to scope mount 30. Since scope mount 30 is secured to scope 26, which is secured to rifle 28, the coupling of universal mounting member 16 and scope mount 30 mounts camera 10 onto rifle 28. Mounting member 16 and scope mount 30 are designed such that camera 10 is positioned downwardly and laterally from scope 26 alongside rifle 28 and does not interfere with use of scope 26 or rifle 28.

In FIG. 1D, universal mounting member 16 is coupled to scope mount 30. Since scope mount 30 is secured to scope 26, which is secured to crossbow 32, the coupling of universal mounting member 16 and scope mount 30 mounts camera 10 onto crossbow. Mounting member 16 and scope mount 30 are designed such that camera 10 is positioned downwardly and laterally from scope 26 alongside crossbow 32 and does not interfere with use of scope 26 or crossbow 32.

FIG. 2 is a perspective view of the components of mounting system 20: universal mounting member 16, gun barrel mount 18, bow mount 24, scope mount 30, and thumb screw 33. Universal mounting member 16 includes first clamp 34 and rail mount or head 36. Gun barrel mount 18 includes first rail receiving track or first track 38 and second clamp 40. Bow mount 24 includes second rail receiving track or second track 42 and threaded attaching member 44. Scope mount 30 includes third rail receiving track or third track 46 and third clamp 48. Head 36 is received into one of first track 38, second track 42, and third track 46 to couple universal mounting member 16 with one of gun barrel mount 18, bow mount 24, and scope mount 30.

Universal mounting member 16 includes a first end having first clamp 34 and an opposite, second end having head 36. First clamp 34 is substantially circular and configured to clamp onto and surround camera 10. In alternative embodiments, first clamp 34 adopts other shapes to securely clamp onto non-circular cameras or other hunting accessories (e.g. rangefinder, game caller, flashlight). Head 36 protrudes from first clamp 34 for coupling with gun barrel mount 18, bow mount 24, and scope mount 30. Extending downwardly into head 36 is a threaded hole for receiving thumb screw 33.

Located at first ends of each of gun barrel mount 18, bow mount 24, and scope mount 30 are first track 38, second track 42, and third track 46, respectively. Each track 38, 42, 46 is shaped for receiving head 36 and includes a central hole for receiving thumb screw 33. Once head 36 is received into and coupled with one of first track 38, second track 42, and third tack 46, the threaded hole in head 36 is aligned with the hole in one of tracks 38, 42, 46. Insertion of thumb screw 33 through the aligned holes secures the mated components and removes the "play" or tolerance between the mated components.

Located at second ends of each of gun barrel mount 18, bow mount 24, and scope mount 30 are means for securing the mount to a particular weapon or weapon accessory. Second end of gun barrel mount 18 includes second clamp 40 for clamping barrel mount 18 onto gun barrel 12 (shown in FIG. 1A). Second end of bow mount 24 includes threaded attaching member 44 for insertion into a threaded aperture on bow 22 (shown in FIG. 1B). Second end of scope mount 30 includes third clamp 48 for clamping scope mount 30 onto scope 26, which can be mounted to a number of different weapons (e.g. shotgun 28 shown in FIG. 1C and crossbow 32 shown in 1D). Coupling universal mounting member 16 with one of gun barrel mount 18, bow mount 24, and scope mount 30 allows a hunter to easily attach an accessory to a plurality of weapons.

Figure 3:
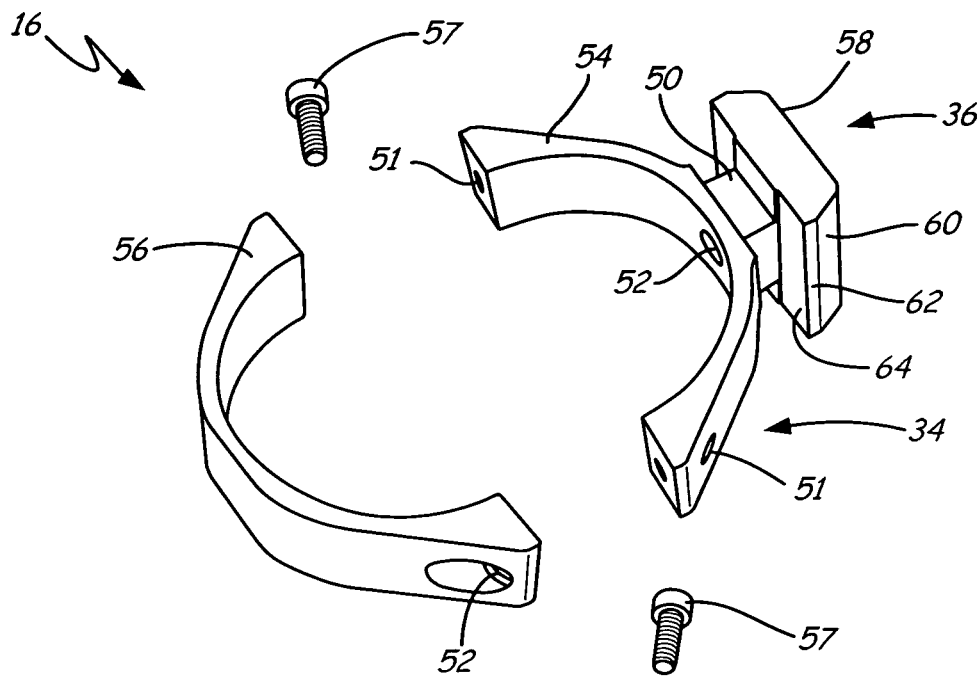
FIG. 3 is a perspective view of a universal mounting member from the mounting system.
Figure 4:
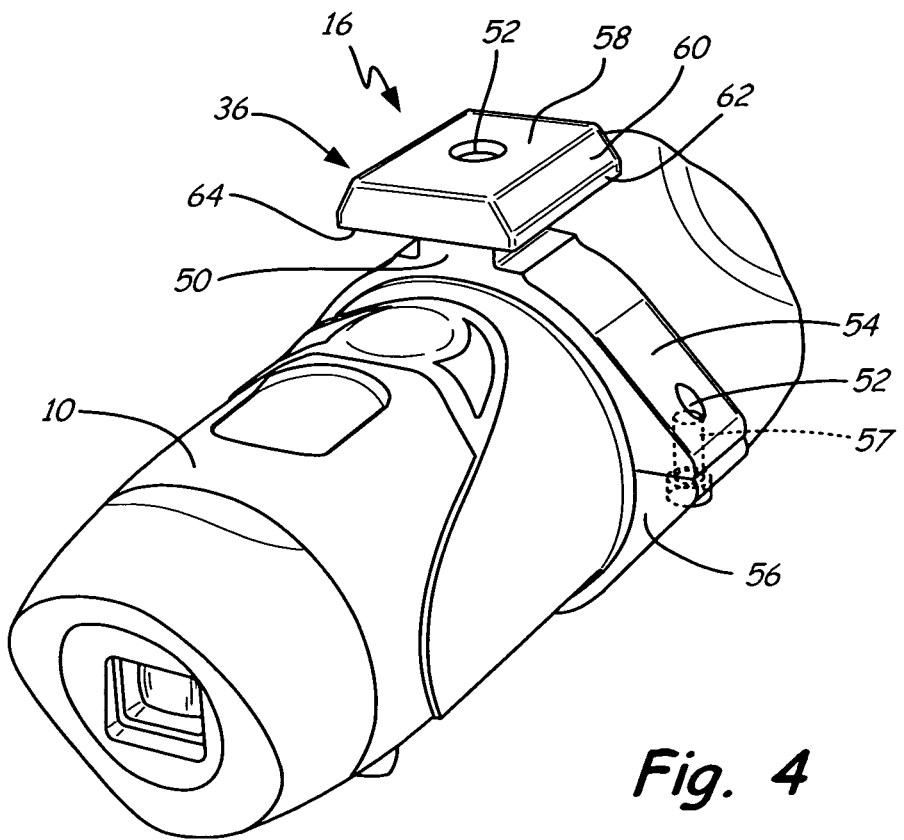
FIG. 4 is a perspective view of the universal mounting member clamped to the camera.

FIGS. 3 and 4 are perspective views of a first embodiment of universal mounting member 16 from mounting system 20. In FIG. 3 universal mounting member 16 is disassembled, and in FIG. 4 universal mounting member 16 is attached to camera 10. Universal mounting member 16 includes first clamp 34, head 36, neck 50, holes 51, and threaded holes 52. First clamp 34 has yoke 54 and strap 56. Yoke 54 includes holes 51, and strap 56 includes threaded holes 52, for receiving screws 57. Head 36 includes top 58, sides 60, edges 62, and bottom 64. In use, first clamp 34 attaches universal mounting member 16 onto camera 10 and head 36 couples universal mounting member 16 with a track (e.g. first track 38, second track 42, or third track 46) on a weapon mount (e.g. gun barrel mount 18, bow mount 24, or scope mount 30).

Semi-circular yoke 54 and semi-circular strap 56 join together to form substantially circular first clamp 34. The flat open ends of yoke 54 each include hole 51 and the flat open ends of strap each include threaded hole 52. To form first clamp 34, flat open ends of yoke 54 are placed above and abut flat open ends of strap 56. Each screw 57 extends first through hole 51 in yoke 54 and second through threaded hole 52 in strap 56. Screws 57 secure yoke 54 to strap 56 and allow first clamp 34 to exert compressive inward force around camera 10, as shown in FIG. 4. Non-circular cameras or different accessories (e.g. rangefinder, game caller, flashlight, laser pointer) may necessitate a different shape for first clamp 34. Different shapes are possible so long as first clamp 34 follows the contours of the accessory and is configured to exert an inwardly clamping force to the accessory.

Head 36 protrudes from a top, central point on yoke 54. Extending between and attaching head 36 to yoke 54 is neck 50. In the depicted embodiment, neck 50 is a short rectangular connection, but in other embodiments for other cameras 10 and accessories neck 50 is elongated to place more distance between yoke 54 and head 36 (e.g. see FIG. 7). When viewed together, head 36 and neck 50 form a T-shape. Head 36 includes flat top 58, angled sides 60 each having bottom edge 62, and flat bottom 64. Top 58 and bottom 64 are parallel to one another and angled sides 60 including edges 62 extend between and connect top 58 to bottom 64. Sides 60 form an obtuse angle with top 50 and extend downwardly and outwardly to flat edge 62. Edges 62 form a substantially right angle with bottom 64, and bottom 64 forms a substantially right angle with neck 50 to complete the T-shape. As shown in FIG. 4, head 36 is clamped to and extending from a top of camera 10 when in use. Once secured to camera 10, head 36 is ready to couple with a track (e.g. first track 38, second track 42, or third track 46) on a weapon mount (e.g. gun barrel mount 18, bow mount 24, or scope mount 30). In the depicted embodiment, head 36 is a male mounting member and is configured to mate with a plurality of female receiving tracks 38, 40, 46. In alternative embodiments the male-female mating relationship is reversed such that head 36 is replaced by a female receiving track and female receiving tracks 38, 40, 46 are replaced by male heads.

Figure 5:
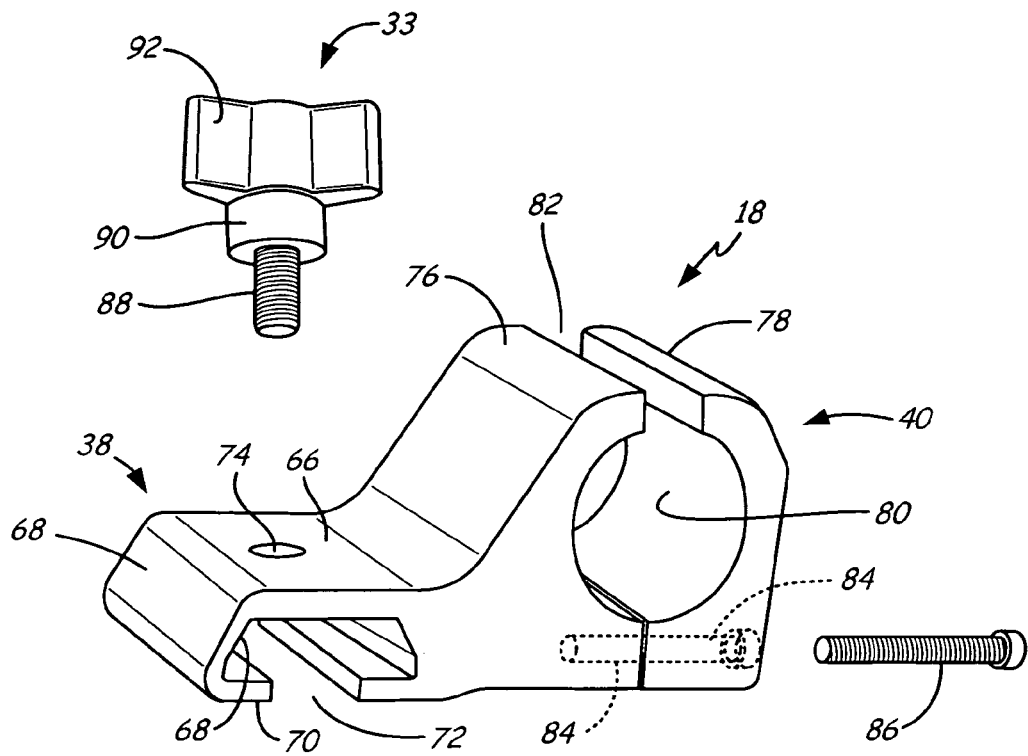
FIG. 5 is a perspective view of a gun barrel mount and a thumb screw from the mounting system.
Figure 6:
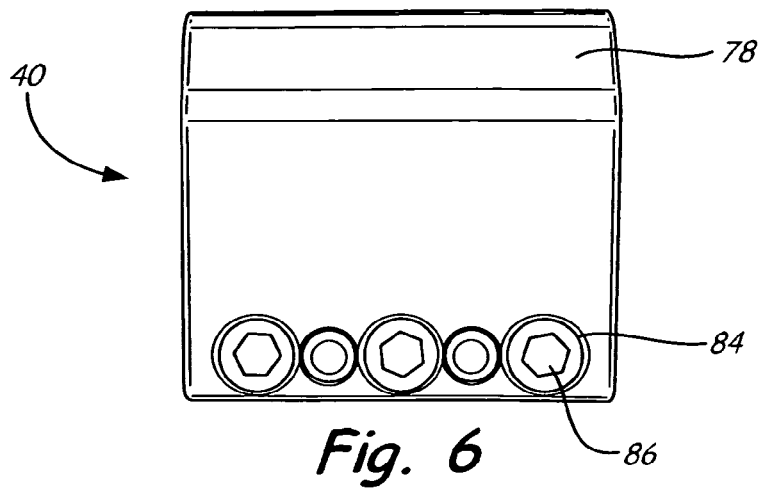
FIG. 6 is an end view of the gun barrel mount.
Figure 7:
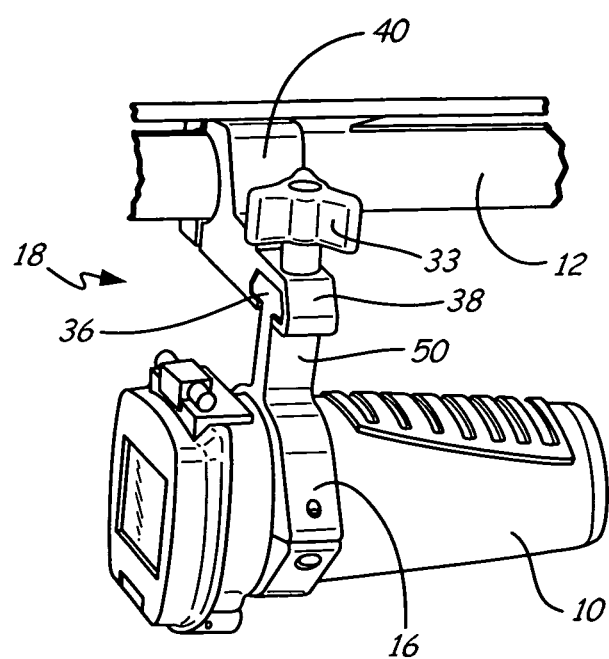
FIG. 7 is an enlarged perspective view of the gun barrel mount attaching the camera to the gun barrel.

FIGS. 5, 6, and 7 depict gun barrel mount 18 from mounting system 20. FIG. 5 is a perspective view of gun barrel mount 18 and thumb screw 33, FIG. 6 is an end view of gun barrel mount 18, and FIG. 7 is an enlarged perspective view of gun barrel mount 18 attaching camera 10 to barrel 12 of shotgun 14. Gun barrel mount 18 includes first track 38 at a first end and second clamp 40 at a second end. First track 38 includes top 66, sides 68, bottom 70, slot 72, and hole 74. Second clamp 40 includes yoke 76, strap 78, opening 80, gap 82, and screw holes 84 for receiving screws 86. Thumb screw 33 includes threaded member 88, stop 90, and screw head 92. Thumb screw 33 secures head 36 inside of first track 38, and second clamp 40 secures gun barrel mount 18 to barrel 12 of shotgun 14.

At a first end of gun barrel mount 18 is first track 38. First track 38 is formed by flat top 66, flat bottom 70, and angled sides 68 extending between and connecting top 66 to bottom 70. Top 66 and bottom 70 are substantially parallel to one another. Sides 68 form an obtuse angle with top 66 and extend downwardly and outwardly to flat edges, which form an approximately right angle with bottom 70. Bottom 70 is not closed and includes central slot 72 for accommodating neck 50. First track 38 is configured to receive and couple with head 36 as shown in FIG. 7. Top 58 of head 36 slides in beneath and parallel to top 66 of first track 38. Sides 60 of head 36 slide in next to and share approximately the same angle as sides 68 of first track 38. Bottom 64 of head 36 slides in above and parallel with bottom of 70 of first track 38. Neck 50 of head 36 extends through slot 72 of first track 38, such that universal mounting member 16 depends downwardly from first track 38 of gun barrel mount 18.

At a second, opposite end of gun barrel mount 18 is second clamp 40. Second clamp 40 is substantially circular and formed by semi-circular yoke 76 and semi-circular strap 78. Yoke 76 extends laterally from first track 38 such that bottom 70 of rail receiving track 38 is substantially parallel with a bottom of yoke 76. A top of yoke 76 extends upwardly and forms an angular sloped surface with top 66 of first track 38. Strap 78 is a mirror image of yoke 76. When the flat bottoms of yoke 76 and strap 78 are aligned they abut and a circular space 80 is formed therebetween. When the tops of yoke 76 and strap 78 are aligned they leave gap 82. Extending through bottom of strap 78 and into bottom near clamp 78 are threaded holes 84. As shown in FIGS. 5 and 6, a plurality of screws 86 are inserted into threaded holes 84 to join the bottom of strap 78 to the bottom yoke 76. When yoke 76 and strap 78 are joined around barrel 12 of shotgun 14, screws 86 are tightened so that second clamp 40 exerts compressive force onto barrel 12 as shown in FIG. 7.

In order to insert head 36 into first track 38, some tolerance is required between the mating components. After head 36 is received into first track 38, hole 74 of first track 38 is aligned above threaded hole 52 of head 36. Threaded member 88 of thumb screw 33 is then inserted through hole 74 of first track 38 and engages with the internal threads of threaded hole 52 in head 36. Thumb screw 33 is further screwed into threaded hole 52 of head 36 by rotation of enlarged screw head 92 until stop 90 contacts top 66 of first track 38. The engagement of thumb screw 33 pulls head 36 upwardly in rail receiving track 38 and removes the tolerance between top 58 of head 36 and top 66 of first track 38. The tolerance is also removed between sides 60 of head 36 and sides 68 of first track 38 such that head 36 and first track 38 are securely coupled and aligned with one another.

Use of gun barrel mount 18 is shown in FIG. 7. Second clamp 44 substantially surrounds barrel 12 of shotgun 14 and head 36 is secured in first track 38 by thumb screw 33. Gun barrel mount 18 extends substantially laterally from barrel 12 and universal mounting member 16 extends substantially vertically from gun barrel mount 18 such that camera 10 is located to the side and slightly below barrel 12 of shotgun 14. Gun barrel mount 18 is ambidextrous and can be positioned either to the right or to the left of barrel 12. So positioned, operation of camera 10 is handy for a hunter and will not interfere with use of shotgun 14.

Figure 8:
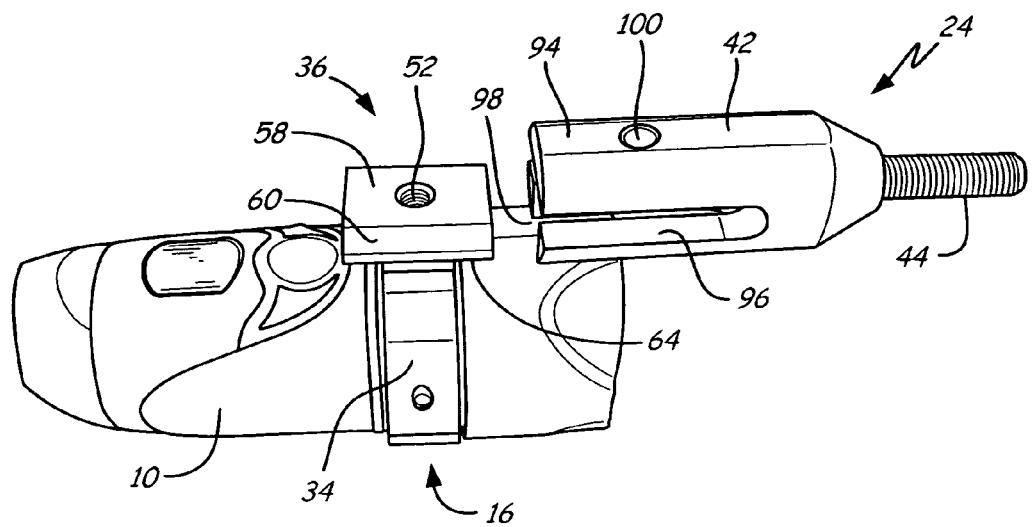
FIG. 8 is a perspective view of a bow mount and the universal mounting member clamped to the camera.
Figure 9:
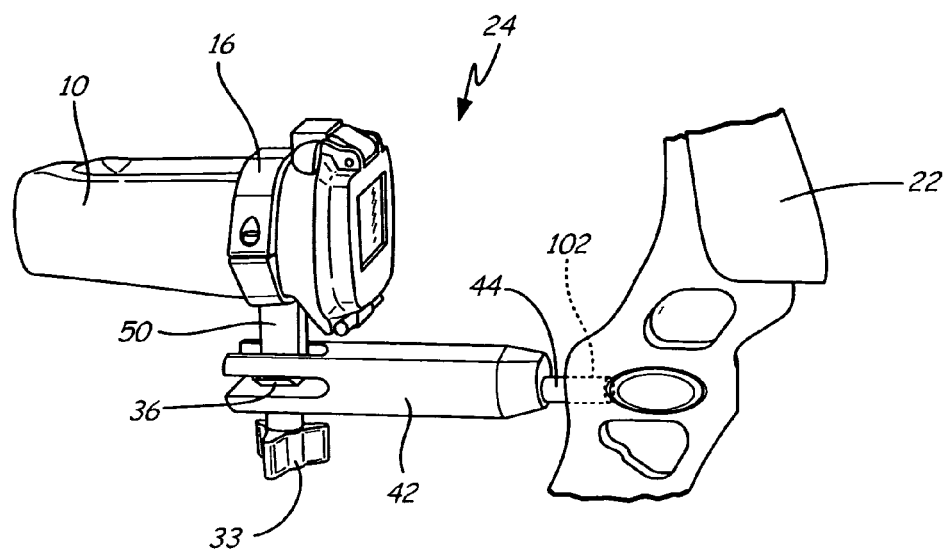
FIG. 9 is an enlarged side view of the bow mount attaching the camera to the bow.

FIG. 8 is a perspective view of bow mount 24 coupling with universal mounting member 16 attached to camera 10, and FIG. 9 is an enlarged side view of bow mount 24 attaching universal mounting member 16, and therefore camera 10, to bow 22. As described above with respect to FIGS. 3 and 4, universal mounting member 16 includes first clamp 34 and head 36. Head 36 further includes threaded hole 52, top 58, sides 60, and bottom 64. Bow mount 24 includes threaded attaching member 44 and second track 42. Second track 42 further includes top 94, bottom 96, slot 98, and hole 100. Second track 42 of bow mount 24 receives head 36 of universal mounting member 16 to attach camera 10 to bow 22.

A first end of bow mount 24 has second track 42. A second, opposite end of bow mount 24 has threaded attaching member 44. Second track 42 is elongated and extends laterally from threaded attaching member 44. Second track 42 is defined by top 94, bottom 96, and slot 98. Top 94 and bottom 96 are substantially parallel to one another. Bottom 96 is split into two pieces by slot 98 to accommodate neck 50. Extending into second track 42 between top 94 and bottom 96 is an elongated opening for receiving head 36. Top 58 of head 36 is received into second track 42 and positioned beneath top 94. Sides 60 of head 36 are received into second track 42 and reside in a space located between top 94 and bottom 96. Bottom 64 of head 36 is received into second track 42 and positioned above bottom 96. Neck 50 extends downwardly from head 36 through slot 98 of second track 42. Once head 36 is received into second rail receiving member 42, hole 100 of bow mount 24 is aligned above threaded hole 52 of universal mounting member 16. Thumb screw 33 can then be inserted through hole 100 into threaded hole 52 to secure head 36 within second track 42 and remove the tolerance from the mated coupling (i.e. align camera 10 with bow mount 24).

FIG. 9 depicts the attachment of camera 10 to bow 22 through bow mount 24 and universal mounting member 16. Threaded attaching member 44 of bow mount 24 is inserted and screwed into threaded aperture 102 located on front of bow 22 for a stabilizing bar. Second track 42 extends outwardly in front of bow 22 to couple with head 36. In the embodiment depicted in FIG. 9, head 36 is attached to a bottom of camera 10 such that neck 50 projects camera 10 upwardly above second track 42. If head 36 extends from a top of camera 10 (as shown in FIG. 8), then camera 10 will depend downwardly below second track 42. In either embodiment, camera 10 is located out in front of bow 22 such that operation of camera 10 is handy, but will not interfere with use of bow 22.

Figure 10:
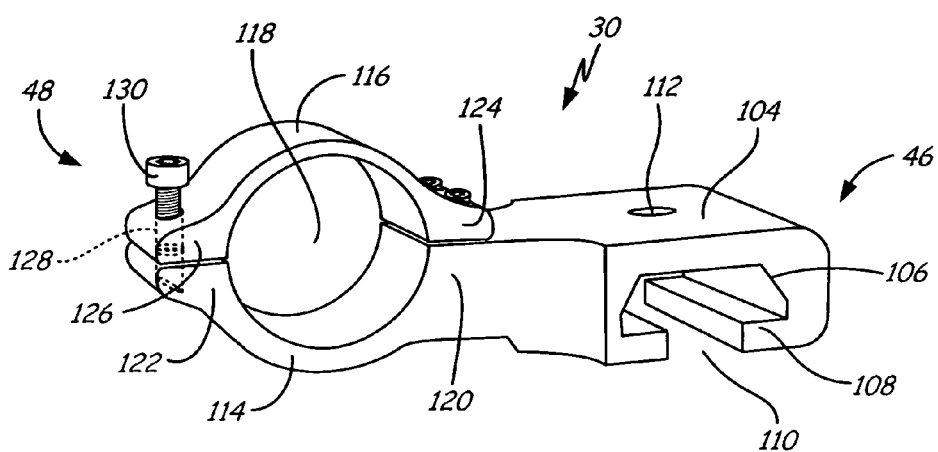
FIG. 10 is a perspective view of a scope mount from the mounting system.
Figure 11:
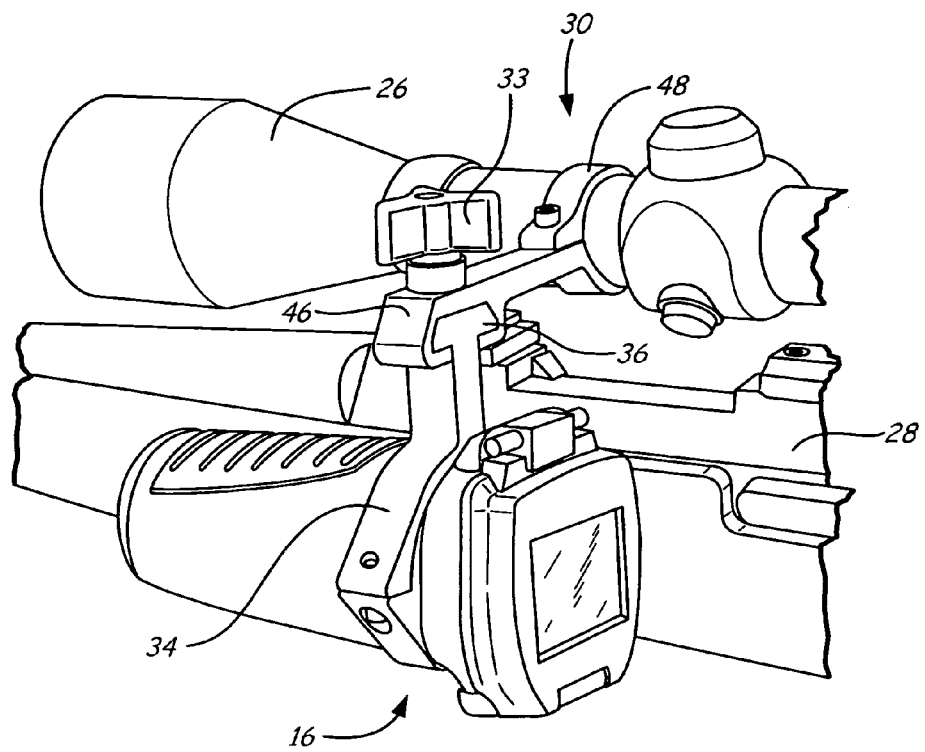
FIG. 11 is an enlarged perspective view of the scope mount attaching the camera to the scope on the gun.

FIG. 10 is a perspective view of scope mount 30 from mounting system 20, and FIG. 11 is an enlarged perspective view of scope mount 30 and thumb screw 33 attaching the camera 10 to scope 26 on rifle 28. Scope mount 30 includes third track 46 at a first end and third clamp 48 and a second end. Third track 46 includes top 104, sides 106, bottom 108, slot 110, and hole 112. Third clamp 48 includes yoke 114, strap 116, and opening 118. Yoke 114 includes near side 120 and far side 122. Strap 116 includes near side 124 and far side 126. Holes 128 and screws 130 extend through strap 116 and yoke 114 to secure third clamp 48 around scope 26, which can be attached to a weapon such as rifle 28 or cross bow 32.

At a first end of scope mount 30 is third track 46. Third track 46 is similar to first track 38 described above with respect to FIG. 5. Third track 46 is defined by flat top 104, flat bottom 108, and angled sides 106 extending between and connecting top 104 to bottom 108. Top 104 and bottom 108 are substantially parallel to one another. Sides 106 form an obtuse angle with top 104 and extend downwardly and outwardly to flat edges, which form an approximately right angle with bottom 108. Ends of bottom 108 are not joined and form slot 110. Third track 46 is configured to receive and couple with head 36 and neck 50 extends through slot 110 as shown in FIG. 10. Top 58 of head 36 slides in beneath and parallel to top 104 of third track 46. Sides 60 of head 36 slide in next to and share approximately the same angle as sides 106 of third track 46. Bottom 64 of head 36 slides in above and parallel with bottom of 108 of third track 46. Neck 50 extends through slot 110 of third track 46, such that universal mounting member 16 depends downwardly from third track 46 of scope mount 30.

At a second, opposite end of scope mount 30 is third clamp 48. Third clamp 48 is similar to first clamp 34 described above with respect to FIG. 3. Third clamp 48 is substantially circular and formed by semi-circular yoke 114 and semi-circular strap 116. Yoke 114 is attached to and extends laterally from third track 46 such that bottom 108 of third track 46 is substantially parallel with a bottom of yoke 114. Ends of both yoke 114 and strap 116 are flat such that yoke 114 and upper clamp 114 can be secured to form central circular space 118. More specifically, near end 120 of yoke 114 abuts near end 124 of strap 116 and far end 122 of yoke 114 abuts far end 126 of strap 116. Ends of yoke 114 and strap 116 are flared to allow space for two screw holes 128 extending therethrough. Screws 130 are inserted through holes 128 on near side 124 of strap 116 and into threaded holes 128 on near side 120 of yoke 114 to secure strap 116 to yoke 114. Similarly, screws 130 are inserted through holes 128 on far side 126 of strap 116 and into threaded holes 128 on far side 122 of yoke 114 to secure strap 116 to yoke 114. When strap 116 and yoke 114 are joined around scope 30, screws 130 are tightened so that third clamp 48 exerts compressive force onto scope 30 as shown in FIG. 11.

As explained above with respect to FIG. 7, some tolerance is required between mating components for assembly and disassembly, but once components are mated the tolerance can be removed so that the accessory is consistently aligned. After head 36 is received into third track 46, hole 112 of third track 46 is aligned above threaded hole 52 of head 36. Threaded member 88 of thumb screw 33 is inserted through hole 112 of third track 46 to engage internal threads of threaded hole 52 in head 36. Thumb screw 33 is further screwed into threaded hole 52 of head 36 by rotation of enlarged screw head 92 until stop 90 contacts top 104 of third track 46. Engagement of thumb screw 33 pulls head 36 upwardly in rail receiving track 46 and removes the tolerance between top 58 of head 36 and top 104 of third track 46. The tolerance is also removed between sides 60 of head 36 and sides 106 of third track 46 such that head 36 and third track 46 are securely coupled to and aligned with one another.

Use of scope mount 30 is shown in FIG. 11. Third clamp 48 surrounds scope 26 mounted on rifle 28 and head 36 is secured in third track 46 by thumb screw 33. Scope 26 can alternatively be mounted to another weapon, such as crossbow 32 shown in FIG. 1D. Scope mount 30 extends substantially laterally from scope 26 and universal mounting member 16 extends substantially downwardly from scope mount 30 such that camera 10 is located to the along side shotgun 28 (or crossbow 32) and below scope 26. Scope mount 30 is ambidextrous such that it can extend to either the right or the left of scope 26. So positioned, operation of camera 10 is handy for a hunter and will not interfere with use of rifle 28 (or crossbow 32).

Figure 12:
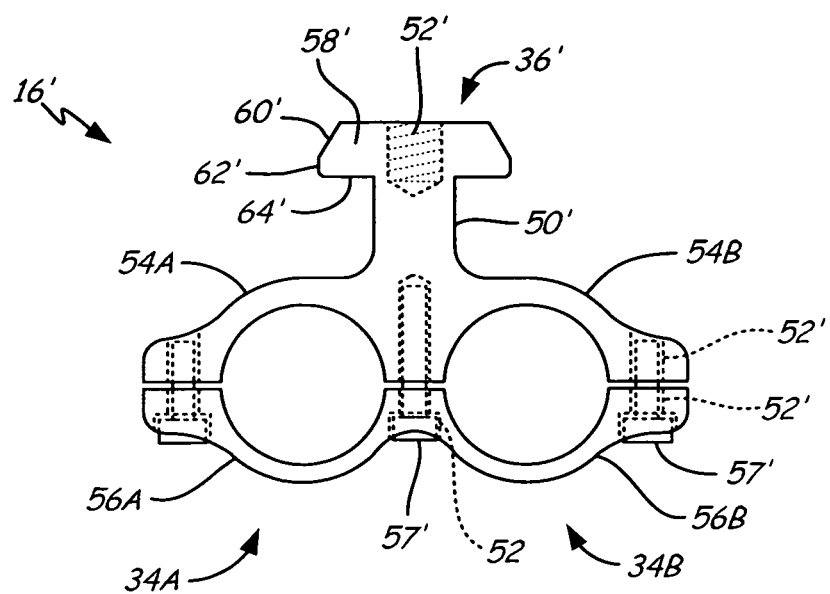
FIG. 12 is a side view of an alternative embodiment of the universal mounting member.

FIG. 12 is a side view of an alternative embodiment of universal mounting member 16' for mounting two accessories side-by-side. Universal mounting member 16' includes left clamp 34A, right clamp 34B, head 36', neck 50', and threaded hole 52'. Left clamp 34A includes yoke 54A and strap 56A, and right clamp 34B includes yoke 54B and strap 56B. Upper clamps 54A, 54B and lower clamps 56A, 56B include holes 52' for receiving screws 57'. Head 36' includes top 58', sides 60', edges 62', and bottom 64'. Left clamp 34A and right clamp 34B attach universal mounting member 16' onto two accessories and head 36' couples with a track (e.g. first track 38, second track 42, or third track 46) on a weapon mount (e.g. gun barrel mount 18, bow mount 24, or scope mount 30).

Universal mounting member 16' is substantially similar to universal mounting member 16 described above with reference to FIGS. 3-4 and like reference numerals designate like components. Instead of forming a single circular clamp (see first clamp 34 in FIGS. 3-4), universal mounting member 16' includes two side-by-side circular clamps: left clamp 34A and right clamp 34B. Yoke 54' includes left semi-circle 54A and right semi-circle 54B. Similarly, strap 56' includes left semi-circle 56A and right semi-circle 56B. When flat open ends and centers of yoke 54A, 54B and strap 56A, 56B are joined, two substantially circular side-by-side clamps 34A, 34B are formed. The flat open ends of yoke 54A, 54B and strap 56A, 56B, as well as the flat open center between left (54A, 56A) and right (54B, 56B) sides, each include holes 52' for receiving screws 57'. When flat open ends and centers of yoke 54A, 54B abut flat open ends and centers of strap 56A, 56B, left clamp 34A and right clamp 34B are formed. Screws 57' extend firstly through holes 52' in strap 56A, 56B and secondly into threaded holes 52' in yoke 54A, 54B at the joined ends and center. Screws 57' secure yoke 54A, 54B to strap 56A, 56B and allow left clamp 54A and right clamp 56A to exert compressive inward force around two circular accessories, such as a flashlight and a laser pointer. In an alternative embodiment, left clamp 54A is located above right clamp 56A such that two accessories can be mounted vertically with one accessory being located on top of the other accessory.

For the sake of brevity, head 36' will not be described in detail as head 36' is substantially similar to head 36 described above with reference to FIGS. 3 and 4. Head 36' is coupled to a weapon mount in order to mount two accessories to a weapon. As shown above with respect to head 36, head 36' is receivable into first track 38 of gun barrel mount 18 (FIGS. 5-7), second track 42 of bow mount 24 (FIGS. 8-9) and third track 46 scope mount 30 (FIGS. 10-11). Neck 50' extends downwardly from head 36' and is accommodated by slots 72, 98, 100 as described above for Neck 50. Just as with head 36, thumb screw 33 is inserted to secure the connection between any given track and head 36' and remove any tolerance therebetween. Universal mounting member 16' provides further flexibility to mounting kit 20 by providing left clamp 34A and right clamp 34B that can mount two accessories simultaneously to any one of the weapon mounts.

Figure 13:
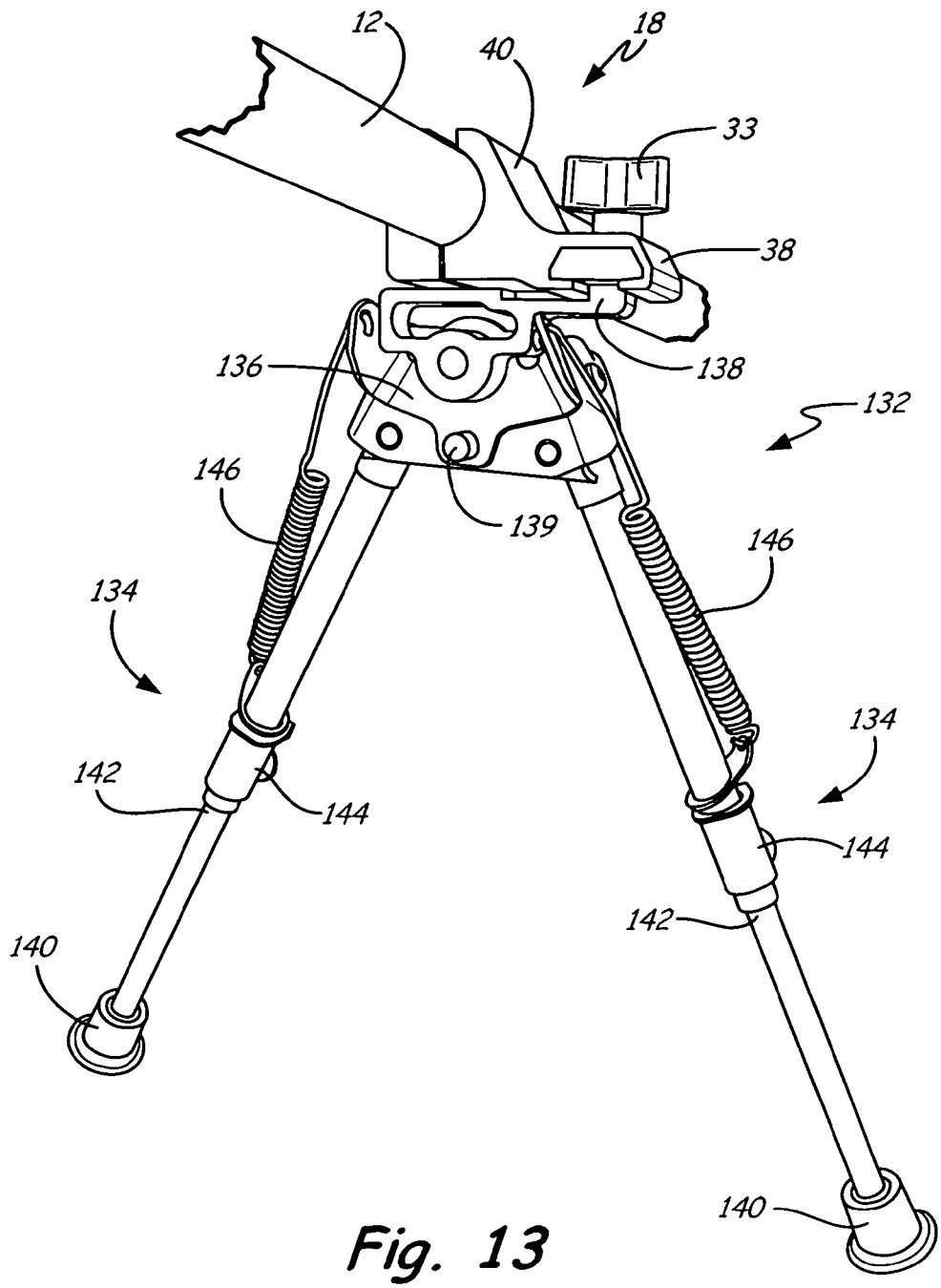
FIG. 13 is a side view of a bipod coupled with the gun barrel mount.

FIG. 13 is a side view of bipod 132 coupled with gun barrel mount 18, which is clamped onto gun barrel 12. As described above with reference to FIGS. 5-7, gun barrel mount 18 includes first track 38 and first clamp 40. Bipod 132 includes two legs 134, support 136, bipod mount 138, and screw 139. Legs 134 each include foot 140, telescoping portion 142, lock 144, and spring 146. Thumb screw 33 secures bipod mount 138 within gun barrel mount 18, such that gun barrel 12 is supported above the ground by bipod 132.

Bipod 132 is additional accessory that couples with gun barrel mount 18 of mounting kit 20. As described above with reference to FIG. 5, second clamp 40 surrounds gun barrel 12 and first track 38 extends laterally from second clamp 40. In FIG. 13, bipod 132 is coupled to first track 38 of gun barrel mount 18. Legs 134 of bipod extend vertically upwards and toward one another to attach with central support 136. Located on a top on support 136 is bipod mount 138 (shown and described in detail below with respect to FIG. 14). Bipod mount 138 is attached to support 136 by screw 139 and is configured to couple with first track 38 of gun barrel mount 18. The bottom of each leg 134 has enlarged foot 140 for contacting the ground. Just above foot 140, each leg 134 has telescoping portion 142 securable by lock 144 such that the overall length of legs 134 is adjustable. Springs 146 extend between a mid portion of legs 134 and support 136 for providing tension therebetween. In use, legs 134 are extended to a desired length and secured at the desired length by lock 144. Bipod mount 138 is coupled with gun barrel mount 18, and the coupling is secured by insertion of thumb screw 33. Once bipod mount 138 and gun barrel mount 18 are coupled and secured, legs 134 of bipod 132 support gun barrel 12 above the ground for hands-free use by a hunter.

Figure 14:
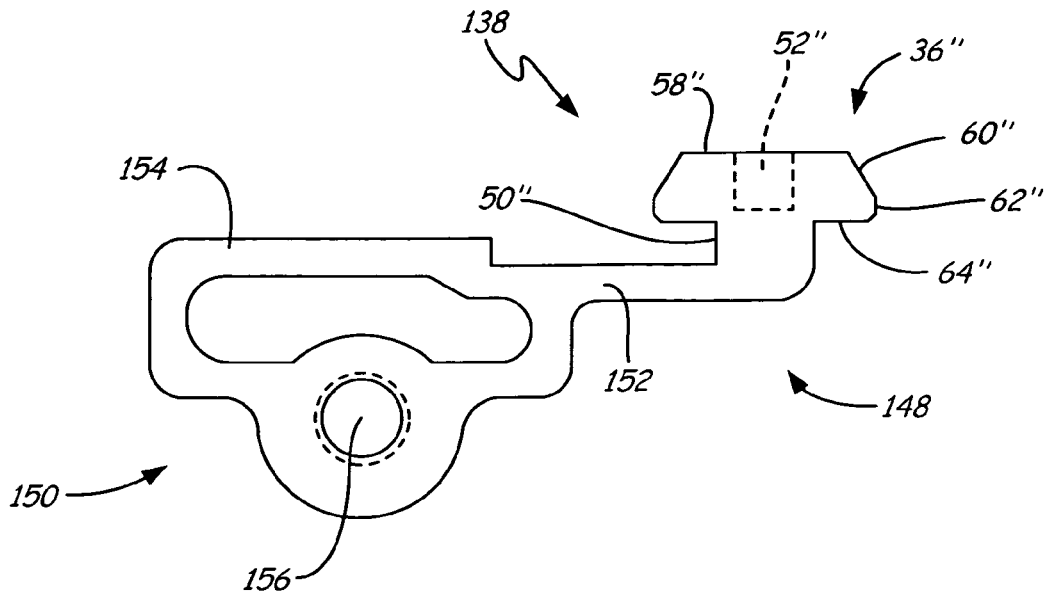
FIG. 14 is a side view of a mounting bracket from the bipod.

FIG. 14 is a side view of bipod mount 138 from bipod 132. Bipod mount 138 has first end 148, second end 150, and arm 152 extending between first end 148 and second end 150. First end 148 includes head 36", neck 50", hole 52", top 58", sides 60", corners 62", and bottom 64". Second end 150 includes vertical spacer 154 and screw hole 156. Screw 139 (shown in FIG. 13) extends through screw hole 156 to couple bipod mount 138 to bipod 132, and head 36" couples with gun barrel mount 18 to attach bipod 132 to gun barrel 12.

First end 148 of bipod mount 138 includes head 36", which is substantially similar to head 36' (described above with reference to FIG. 12) and head 36 (described above with reference to FIGS. 3-4). Head 36" is receivable into first track 38 of gun barrel mount 18 as shown in FIG. 13. Thumb screw 33 is inserted into hole 50" to secure the connection between head 36" and first track 38 of gun barrel mount 18 and remove any tolerance therebetween. Opposite, second end 150 is attached to first end 148 by laterally extending arm 152. Second end 150 includes vertical spacer 154 attached on top of screw hole 156. Vertical spacer 154 is configured to extend slightly above support 136 of bipod 132 and provide vertical clearance for laterally extending arm 152. Screw hole 156 is aligned with a screw hole on support 136 and is configured to receive screw 139 (shown in FIG. 13) thereby attaching second end 150 of bipod mount 138 to bipod 132. Once bipod mount 138 is secured onto bipod 132, coupling of head 36" and second track 38 will attach bipod 132 to gun barrel 12 for use as a support (shown in FIG. 13).

Figure 15:
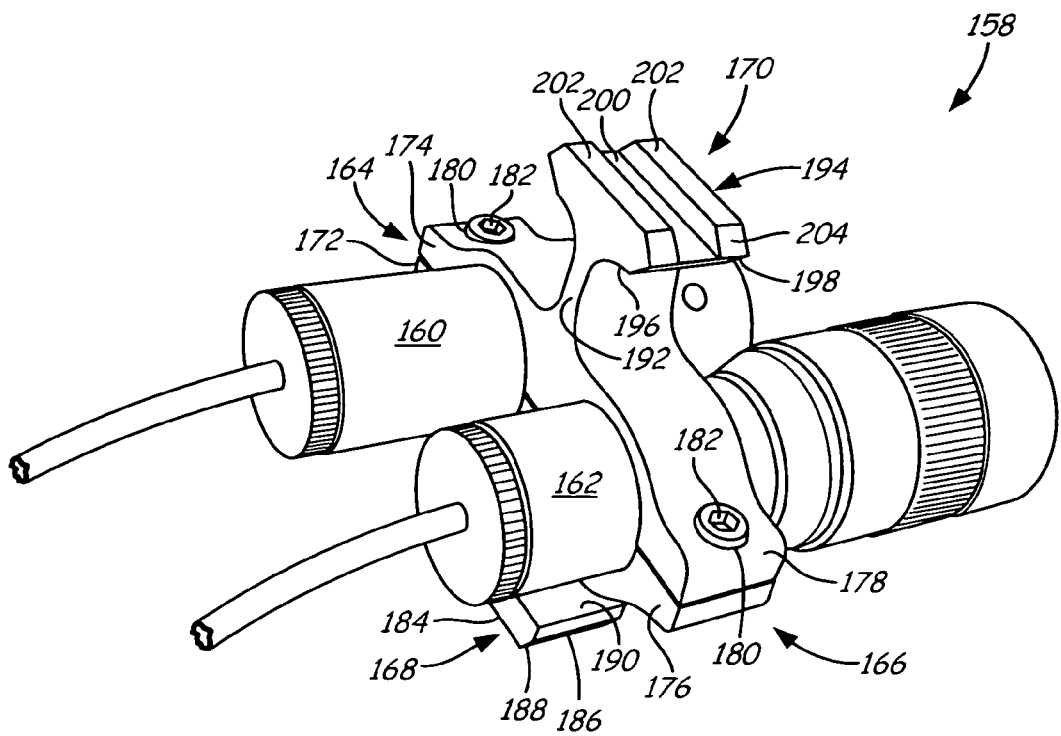
FIG. 15 is a bottom perspective view of an alternative embodiment of the universal mounting member.

FIG. 15 is a bottom perspective view of an alternative embodiment of universal mounting member 158 for mounting two accessories side-by-side (e.g. laser pointer 160 and flashlight 162). Universal mounting member 158 includes left clamp 164, right clamp 166, mounting head 168, and picatinny rail 170. Left clamp 164 includes left yoke 172 and left strap 174, and right clamp 166 includes right yoke 176 and right strap 178. Yokes 172, 176 and straps 174, 178 include holes 180 for receiving screws 182. Head 168 includes top 184, edges 186, sides 188, and bottom 190. Picatinny rail 170 includes neck 192 and head 194. Head 194 includes bottom surface 196, sides 198, top surface 200, rails 202, and rail edges 204. Left clamp 164 is secured around laser pointer 160 and right clamp 166 is secured around flashlight 162. Mounting head 168 is received by a track (e.g. first track 38, second track 42, or third track 46) on a weapon mount (e.g. gun barrel mount 18, bow mount 24, or scope mount 30) to mount laser pointer aimer 160 and flashlight 162 to a weapon. Picatinny rail 170 allows for attachment of additional accessories to universal mount member 158 and therefore, the weapon.

Universal mounting member 158 is substantially similar to universal mounting member 16' described above with reference to FIG. 12. The table below matches substantially similar elements of universal mounting member 158 from FIG. 15 to universal mounting member 16' of FIG. 12 by reference number.

| Element name | Reference number FIG. 15 | Reference number FIG. 12 |
|---|---|---|
| Universal mounting member | 158 | 16' |
| Left clamp | 164 | 34A |
| Right clamp | 166 | 34B |
| Mounting head | 168 | 36' |
| Left yoke | 172 | 54A |
| Left strap | 174 | 56A |
| Right yoke | 176 | 54B |
| Right strap | 178 | 56B |
| Holes | 180 | 52' |
| Screws | 182 | 57' |
| Head top | 184 | 58' |
| Head edges | 186 | 62' |
| Head sides | 188 | 60' |
| Head bottom | 190 | 64' |

In contrast to universal mounting member 16' of FIG. 12, universal mounting member 158 of FIG. 15 includes picatinny rail 170 for securing additional accessories to a weapon.

Universal mounting member 158 includes two side-by-side circular clamps: left clamp 164 and right clamp 166. Left clamp 164 includes yoke 172 and strap 174 and similarly, right clamp 166 includes yoke 176 and strap 178. When flat open ends and centers of yokes 172, 176 and straps 174, 178 are joined, two substantially circular side-by-side clamps 164, 166 are formed. The flat open ends of yokes 172, 176 and straps 174, 178, each include holes 180 for receiving screws 182. Screws 182 secure left yoke 172 to left strap 174 and right yoke 176 to right strap 178 to allow left clamp 164 and right clamp 166 to exert compressive inward force around two circular accessories, such as laser pointer 160 and flashlight 162. In the depicted embodiment, laser pointer 160 and flashlight 162 are mounted in a parallel configuration and a common plane (i.e. coplanar), although other configurations are possible.

Mounting head 168 extends vertically from a central location of universal mounting member 158 between yokes 172, 176. Extending between and attaching head 168 to yokes 172, 176 is a neck (not visible in FIG. 15, but see neck 50' in FIG. 12). Head 168 includes flat top 184, angled sides 188, edges 186, and flat bottom 190. Top 184 and bottom 190 are parallel to one another and angled sides 188 including edges 166 extend between and connect top 184 to bottom 190. Sides 188 form an obtuse angle with top 184 and extend downwardly and outwardly to edge 186. Edge 186 forms a substantially right angle with bottom 190. Mounting head 168 is coupled to a weapon mount in order to mount two accessories (e.g. laser pointer 160 and flashlight 162) to a weapon. Mounting head 168 is receivable into first track 38 of gun barrel mount 18 (FIGS. 5-7), second track 42 of bow mount 24 (FIGS. 8-9) and third track 46 scope mount 30 (FIGS. 10-11), and securable in any given track by a thumb screw.

Picatinny rail 170 is located opposite of mounting head 168 on universal mounting member 158. A first end of neck 192 is attached between straps 174, 178 and a second end of neck 192 is attached to head 194. Neck 192 extends vertically from a central location of universal mounting member 158 between straps 174, 178 to space head 194 a distance from clamps 164, 166. Head 194 is defined by bottom 196, sides 198, and top surface 200. Bottom 196 is attached to second side of neck 192. Sides 198 extend at obtuse angles from bottom 196 to top surface 200. Attached along top surface 200 are rails 202. Two parallel rails 202 project from top surface 200 in a plane perpendicular to laser pointer 160 and flashlight 162 Both sides of rails 202 have angled edges 204. Picatinny rail 170 is configured to mount additional accessories to universal rail mount 158. A third accessory can be mounted to picatinny rail 170 in a plane perpendicular to the plane shared by coplanar laser pointer 160 and flashlight 162. Accordingly, universal rail mount 158 is configured to attach a plurality of accessories to a weapon.

Figure 16:
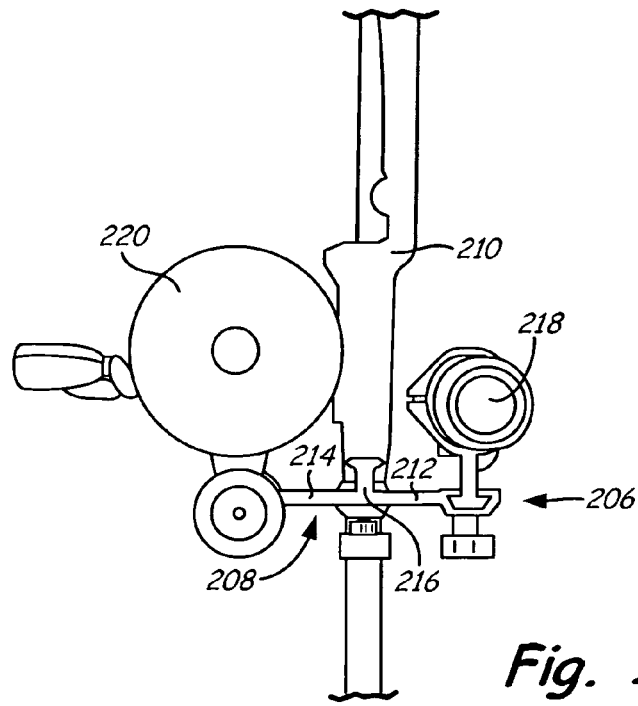
FIG. 16 is a front view of an alternative embodiment of the universal mounting member coupled to a lateral mount, which is mounted on a bow by a bow mount.

FIG. 16 is a front view of an alternative embodiment of universal mounting member 206 coupled to lateral mount 208, which is mounted to bow 210 by a bow mount. Lateral mount 208 includes first side 212, second side 214, and center portion 216. Camera 218 is secured to first side 212 of lateral mount 208, and fishing reel 220 is secured to second side 214 of lateral mount 208. Center portion 216 of lateral mount 208 is attached to bow 210, thereby mounting camera 218 and fishing reel 220 to bow 210.

Universal mounting member 206 has a first side surrounding camera 218 and a second side coupled to first side 212 of lateral mount 208. Lateral mount 208 has a first side 212, an opposite second side 214, and a center portion 216 extending between and connecting first side 212 to second side 214. First side 212 of lateral mount 208 is configured to couple with a first accessory (e.g. universal mounting member 206 surrounding camera 218), and second side 214 of lateral mount 208 is configured to couple with a second accessory (e.g. fishing reel 220). Central portion 216 is also configured to couple with a third accessory (e.g. laser pointer or flashlight).

Center portion 216 of lateral mount 208 is coupled to a bow mount (e.g. bow mount 246 shown and described with reference to FIGS. 17-18), which is received into a threaded hole in a center of bow 210 such that lateral mount 208 extends out in front of bow 210. First end 212 of lateral mount 208 projects laterally in a first direction thereby placing universal mounting member 206 and attached camera 218 off to a first side of bow 210. Second end of lateral mount 208 projects laterally in a second direction (opposite the first direction) thereby placing secured fishing reel 220 off to a second side of bow 210. As depicted, fishing reel 220 and camera 218 are secured to bow 210 in a parallel configuration and share a common horizontal plane, which is perpendicular to the vertical plane of bow 210. The structure and function of universal mounting member 206 and lateral mount 208 are described in further detail below with reference to FIGS. 17-18.

Figure 17:
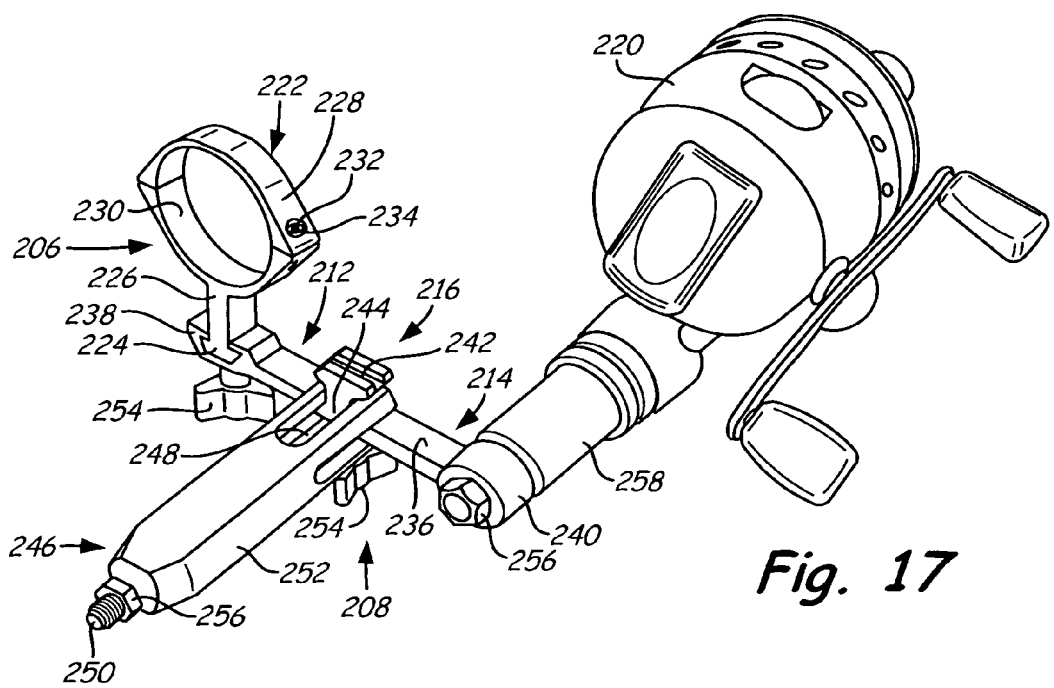
FIG. 17 is a top perspective view of the universal mounting member, lateral mount, and bow mount from FIG. 16.
Figure 18:
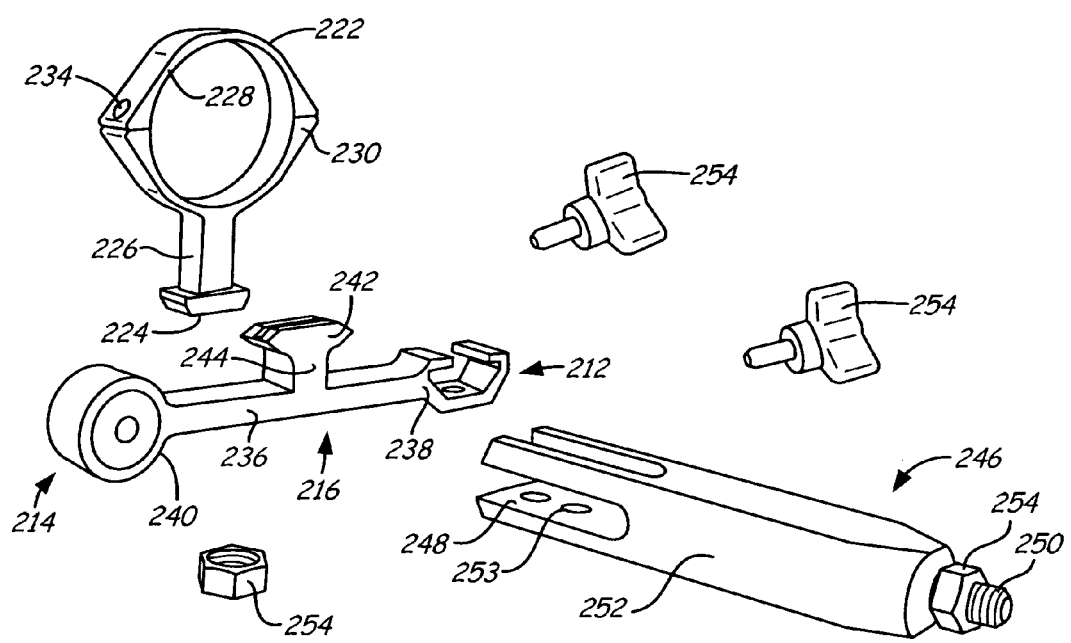
FIG. 18 is a perspective view of the components of the universal mounting member, lateral mount, and bow mount from FIGS. 16-17.

FIG. 17 is a top perspective view of universal mounting member 206 and lateral mount 208 from FIG. 16 with camera 218 and bow 210 removed, but fishing reel 220 and bow mount 246 attached. FIG. 18 is a perspective view of the components of universal mounting member 206, lateral mount 208, and bow mount 246 from FIGS. 16-17 disassembled with bow 210, camera 218, and fishing reel 220 omitted. Universal mounting member 206 includes first clamp 222, head 224, neck 226, yoke 228, and strap 230. Screws 232 extend through holes 234 in yoke 228 and strap 230 to secure first clamp 222 around an accessory such as camera 218. Lateral mount 208 includes first end 212, second end 214, center 216, arm 236, track 238, circle mount 240, picatinny rail 242, and neck 244. Bow mount 246 includes track 248, threaded attaching member 250, stabilizer 252, and holes 253. Also shown are fastening members: thumb screws 254, washers 256, and reel seat 258. Lateral mount 208 is configured to secure accessories to bow mount 246, which is configured to attach lateral mount 208 to a bow.

Universal mounting member 206 in FIGS. 16-18 is substantially similar to universal mounting member 16 described above with reference to FIGS. 3-4. The table below matches substantially similar elements of universal mounting member 206 from FIGS. 16-18 to universal mounting member 16 of FIGS. 3-4 by reference number.

| Element name | Reference number FIGS. 16-18 | Reference number FIGS. 3-4 |
| --- | --- | --- |
| Universal mounting member | 206 | 16 |
| First clamp | 222 | 34 |
| Head | 224 | 36 |
| Neck | 226 | 50 |
| Yoke | 228 | 54 |
| Strap | 230 | 56 |
| Screws | 232 | 57 |
| Holes | 234 | 51 |

Universal mounting member 206 includes a first end having first clamp 222 and an opposite, second end having head 224. First clamp 222 is substantially circular and configured to clamp onto and surround a camera, such as camera 218 shown in FIG. 16. Head 224 protrudes from a top, central point on yoke 228. Extending between and attaching head 224 to yoke 228 is neck 226. The specific structure and geometry of head 224 are identical to head 36 described above with reference to FIGS. 3-4 and therefore, not repeated here. When viewed together, head 224 and neck 226 form a T-shape. Semi-circular yoke 228 and semi-circular strap 230 join together to form substantially circular first clamp 222. The flat open ends of yoke 228 and strap 230 each include hole 232. To form first clamp 222, flat open ends of yoke 228 are placed above and abut flat open ends of strap 230. Each screw 232 extends first through hole 234 in yoke 228 and second hole 234 in strap 230 to exert compressive inward force around camera 218, as shown in FIG. 16. Head 224 protrudes from first clamp 222 for coupling with lateral mount 208. Extending into head 224 is a threaded hole for receiving thumb screw 254, which secures the connection between universal mounting member 206 and lateral mount 208.

Lateral mount 208 includes first end 212, second end 214 located opposite of first end 212, and center 216 located centrally between first end 212 and second end 214. Center 216 includes arm 236, which extends laterally to attach first end 212 to second end 214, but also provide space between first end 212 and second end 214. Located at first end 212 of lateral mount 208 is track 238 configured to receive head 234 of universal mounting member 206. The specific structure and geometry of track 238 are identical to first track 38 described above with reference to FIG. 5 and therefore, not repeated here. Thumb screw 254 is inserted through a hole in track 238 and into head 234 to secure universal device mount 206 to lateral mount 208. Located at second end 214 of lateral mount 208 is circle mount 240 configured to receive reel seat 258 of fishing reel 220. A threaded end of reel seat 258 is inserted into a threaded circular hole of circle mount 240 and secured in place by washer 254. Extending vertically from center 216 of lateral mount 208 is picatinny rail 242. The structure and geometry of picatinny rail 242 are identical to picatinny rail 170 described above with reference to FIG. 5 and therefore, not repeated here. Neck 244 projects from center portion 216 to attach picatinny rail 242 to lateral mount 208. Picatinny rail 242 is configured to attach an additional accessory to lateral mount 208, such as a flash light or a laser pointer.

Bow mount 246 in FIGS. 16-18 is similar to bow mount 24 described above with reference to FIGS. 8-9. The table below matches substantially similar elements of bow mount 246 from FIGS. 16-18 to bow mount 16 of FIGS. 8-9 by reference number.

| Element name | Reference number FIG. 16-18 | Reference number FIG. 8-9 |
| --- | --- | --- |
| Bow mount | 246 | 24 |
| Second track | 248 | 42 |
| Threaded attaching member | 250 | 44 |
| Hole | 253 | 100 |

A first end of bow mount 246 has second track 248 and a second, opposite end of bow mount 246 has threaded attaching member 250. Second track 248 is elongated and is spaced laterally from threaded attaching member 250 by central stabilizer 252. The structure and geometry of second track 248 is identical to second track 42 described above with reference to FIGS. 8-9 and therefore, is not repeated here. Top of second track 248 is spilt into two pieces in order to receive neck 244 of lateral mount 208. Thumb screw 254 extends through hole 253 in second track 248 and into center 216 of lateral mount 208 to secure bow mount 246 to lateral mount 208. So attached, bow mount 246 extends in a direction perpendicular to arm 236 of lateral mount 208. Threaded attaching member 250 is configured to be inserted and screwed into a threaded aperture located on front of a bow for a stabilizer as shown in FIG. 9. When threaded attaching member 250 is secured to a bow (e.g. bow 22 in FIG. 9 or bow 210 in FIG. 16), bow mount 246 projects out in front of the bow, to place lateral mount 208 and any attached accessories (e.g. camera 218, fishing reel 220, laser pointer, or flashlight) in a location handy for operation, but without interfering with use of the bow. Accordingly, a combination of universal mounting member 206, lateral mount 208, and bow mount 246 allows a hunter to film his or herself while bow fishing.

Although the present invention has been described with reference to preferred embodiments, workers skilled in the art will recognize that changes may be made in form and detail without departing from the spirit and scope of the invention.

The invention claimed is:

1. A device for mounting more than one accessory to a weapon, the device comprising:
a clamp for receiving a first accessory, the clamp having a yoke and a strap securable around the first accessory;
a circular opening for receiving a second accessory, the circular opening spaced laterally from the clamp such that the first accessory and the second accessory can be received in a parallel configuration; and
a weapon mount located centrally between the clamp and the circular opening for attaching the device to the weapon.

2. The device of claim 1, wherein the clamp and circular opening are in a side-by-side relationship.

3. The device of claim 1, wherein the yoke and strap are secured by a screw.

4. The device of claim 1, wherein the circular opening is a second clamp having a second yoke and a second strap securable around the second accessory.

5. The device of claim 1, wherein the circular opening is threaded for receiving a threaded member.

6. The device of claim 1, wherein the device includes a picatinny rail located centrally between the clamp and the circular opening.

7. The device of claim 6, wherein the picatinny rail extends in a direction perpendicular to the clamp and the circular opening.

8. A device for mounting more than one accessory to a weapon, the device comprising:
a first clamp for receiving a first accessory, the first clamp having a yoke and a strap securable around the first accessory;
a second clamp for receiving a second accessory, the second clamp having a second yoke and a second strap securable around the second accessory, the second clamp spaced laterally from the first clamp such that the first accessory and the second accessory are received in a parallel configuration; and
a weapon mount for attaching the device to the weapon, the weapon mount located centrally between the first clamp and the second clamp.

9. The device of claim 8, wherein the first clamp and the second clamp lie in a first plane.

10. The device of claim 9, wherein the weapon mount extends from a first side of the device in a direction perpendicular to both the first clamp and the second clamp.

11. The device of claim 10, wherein the weapon mount is T-shaped and includes a threaded recess for receiving a screw.

12. The device of claim 10, further comprising:
a picatinny rail located centrally between the first clamp and the second clamp, the picatinny rail extending from a second side of the device, the second side of the device being opposite the first side of the device.

13. The device of claim 12, wherein the picatinny rail and the weapon mount lie in a second plane.

14. A device for mounting more than one accessory to a weapon, the device comprising:
a clamp for receiving a first accessory, the clamp having a yoke, a strap, and a head protruding from the strap;
a track for receiving the head;
an arm extending laterally from a first end to a second end, the track located at the first end;
a circular opening for receiving a second accessory, the circular opening located at the second end; and
a bow mount for attaching the device to a bow, the bow mount attached centrally to the arm between the first end and the second end.

15. The device of claim 14, further comprising:
a first screw securing the yoke and the strap around the first accessory; and
a second screw securing the head within the track.

16. The device of claim 14, wherein the bow mount includes a threaded attaching member for attaching the bow mount to a threaded aperture in the bow.

17. The device of claim 14, further comprising:
a picatinny rail attached centrally to the arm between the first end and the second end.

18. The device of claim 14, wherein the first accessory and the second accessory are received in a parallel configuration.

19. The device of claim 14, wherein the first accessory is a camera.

20. The device of claim 14, wherein the second accessory is a fishing reel.

* * * * *